United States Patent
Sjöberg et al.

(10) Patent No.: US 11,889,085 B2
(45) Date of Patent: Jan. 30, 2024

(54) METHODS PROVIDING ENCODING/DECODING OF DEPENDENT/INDEPENDENT PARTITIONS AND RELATED DEVICES

(71) Applicant: Telefonaktiebolaget LM Ericsson (publ), Stockholm (SE)

(72) Inventors: Rickard Sjöberg, Stockholm (SE); Mitra Damghanian, Upplands-Bro (SE); Martin Pettersson, Vallentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 156 days.

(21) Appl. No.: 17/437,018

(22) PCT Filed: Mar. 5, 2020

(86) PCT No.: PCT/SE2020/050244
§ 371 (c)(1),
(2) Date: Sep. 7, 2021

(87) PCT Pub. No.: WO2020/185145
PCT Pub. Date: Sep. 17, 2020

(65) Prior Publication Data
US 2022/0182644 A1    Jun. 9, 2022

Related U.S. Application Data

(60) Provisional application No. 62/815,548, filed on Mar. 8, 2019.

(51) Int. Cl.
*H04N 19/159* (2014.01)
*H04N 19/117* (2014.01)
(Continued)

(52) U.S. Cl.
CPC ........ *H04N 19/159* (2014.11); *H04N 19/117* (2014.11); *H04N 19/124* (2014.11);
(Continued)

(58) Field of Classification Search
None
See application file for complete search history.

(56) References Cited

U.S. PATENT DOCUMENTS 11,553,180 B2 * 1/2023 Sjöberg ............... H04N 19/174
2012/0163452 A1 6/2012 Horowitz
(Continued)

OTHER PUBLICATIONS

International Search Report and Written Opinion of the International Searching Authority for PCT International Application No. PCT/SE2020/050244 dated May 11, 2020.
(Continued)

*Primary Examiner* — Reza Aghevli
(74) *Attorney, Agent, or Firm* — Sage Patent Group

(57) ABSTRACT

Methods to decode a picture from a bitstream are discussed. A partitioning structure of the picture is determined, wherein the partitioning structure defines at least first and second partitions of the picture. At least one dependency syntax element is decoded from the bitstream, and whether the second partition is dependent on or independent of the first partition is determined based on the at least one dependency syntax element. The picture is decoded from the bitstream based on determining whether the second partition of the picture is dependent on or independent of the first partition of the picture. Related methods of encoding and related devices are also discussed.

20 Claims, 22 Drawing Sheets

(51) Int. Cl.
*H04N 19/124* (2014.01)
*H04N 19/13* (2014.01)
*H04N 19/513* (2014.01)
*H04N 19/70* (2014.01)
*H04N 19/82* (2014.01)

(52) U.S. Cl.
CPC .......... *H04N 19/13* (2014.11); *H04N 19/513* (2014.11); *H04N 19/70* (2014.11); *H04N 19/82* (2014.11)

(56) References Cited

U.S. PATENT DOCUMENTS

| | | | |
|---|---|---|---|
| 2012/0189049 A1* | 7/2012 | Coban | H04N 19/13 |
| | | | 375/E7.125 |
| 2013/0039593 A1* | 2/2013 | Komiya | H04N 19/13 |
| | | | 382/233 |
| 2013/0107952 A1 | 5/2013 | Coban et al. | |
| 2013/0114736 A1 | 5/2013 | Wang et al. | |
| 2014/0301464 A1 | 10/2014 | Wu et al. | |
| 2016/0261868 A1* | 9/2016 | Chien | H04N 19/70 |
| 2016/0277762 A1* | 9/2016 | Zhang | H04N 19/117 |
| 2016/0316200 A1* | 10/2016 | Zhang | H04N 19/107 |
| 2016/0373771 A1* | 12/2016 | Hendry | H04N 19/70 |
| 2016/0381385 A1* | 12/2016 | Ugur | H04N 19/136 |
| | | | 375/240.12 |
| 2017/0013279 A1* | 1/2017 | Puri | H04N 19/85 |
| 2017/0289556 A1* | 10/2017 | Hendry | H04N 19/30 |
| 2018/0020228 A1* | 1/2018 | Wu | H04N 19/91 |
| 2020/0413069 A1* | 12/2020 | Lim | H04N 19/186 |
| 2021/0136396 A1* | 5/2021 | Deshpande | H04N 19/70 |
| 2021/0152828 A1* | 5/2021 | Sjöberg | H04N 19/593 |
| 2021/0227231 A1* | 7/2021 | Hannuksela | H04N 19/46 |
| 2021/0274174 A1* | 9/2021 | Sjöberg | H04N 19/119 |
| 2021/0329263 A1* | 10/2021 | Hendry | H04N 19/188 |
| 2021/0337220 A1* | 10/2021 | Yu | H04N 19/107 |
| 2022/0038685 A1* | 2/2022 | Deshpande | H04N 19/58 |
| 2022/0046286 A1* | 2/2022 | Deshpande | H04N 19/105 |
| 2022/0053207 A1* | 2/2022 | Deshpande | H04N 19/51 |
| 2022/0078486 A1* | 3/2022 | Hannuksela | H04N 21/234345 |
| 2022/0086493 A1* | 3/2022 | Francois | H04N 19/157 |
| 2022/0094909 A1* | 3/2022 | Hannuksela | H04N 19/174 |
| 2023/0097014 A1* | 3/2023 | Sjöberg | H04N 19/593 |
| | | | 375/240.03 |

OTHER PUBLICATIONS

Sjöberg et al., "AHG12: Dependent tiles," Document: JVET-N0497, Joint Video Experts Team (JVET) of ITU-T SG 16 WP 3 and ISO/IEC JTC 1/SC 29/WG 11, 14th Meeting: Geneva, CH, Mar. 19-27, 2019, 5 pages.

Office Action, including English summary, for Taiwanese Patent Application No. 109107538 dated May 20, 2021, 38 pages.

\* cited by examiner

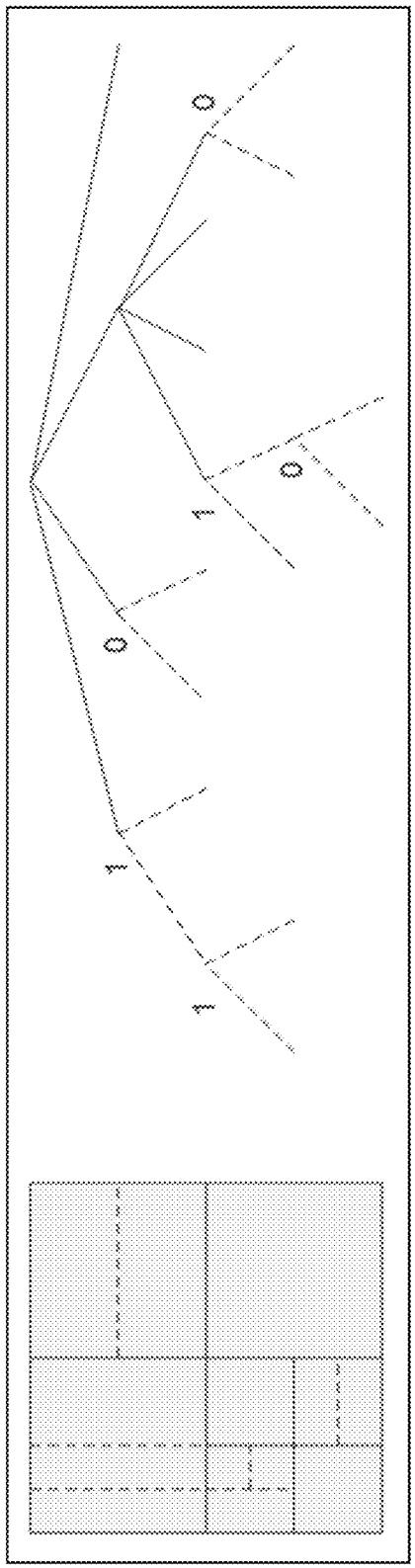

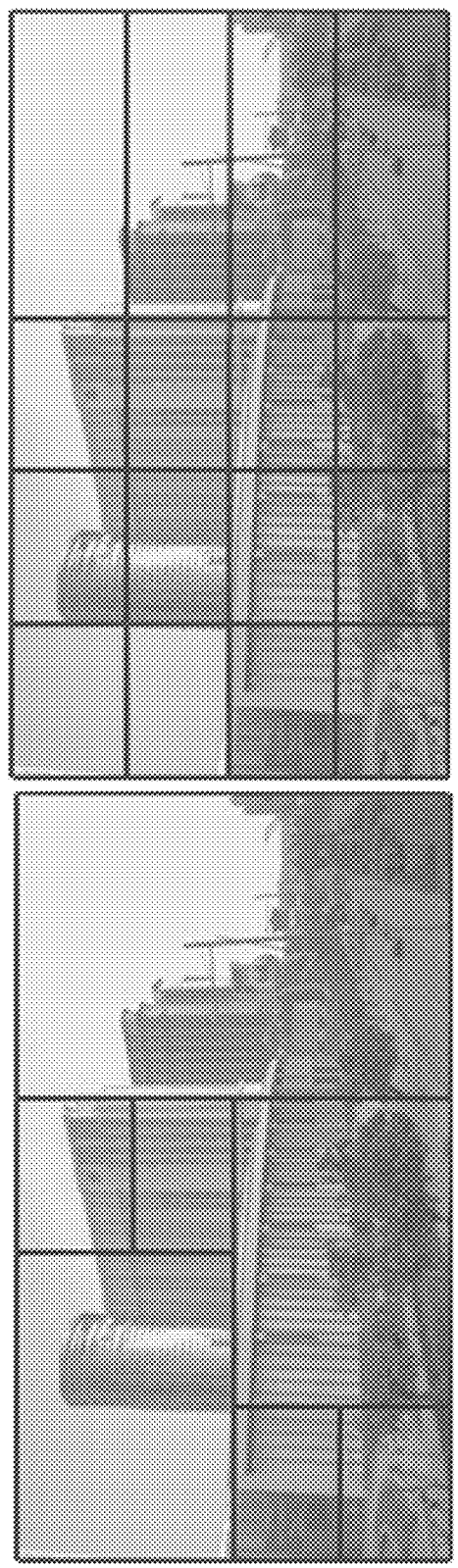

Desired partition

Tile grid

Desired partition using the proposed solution

Picture or tile group border
Border between independent tiles
Border between dependent tiles

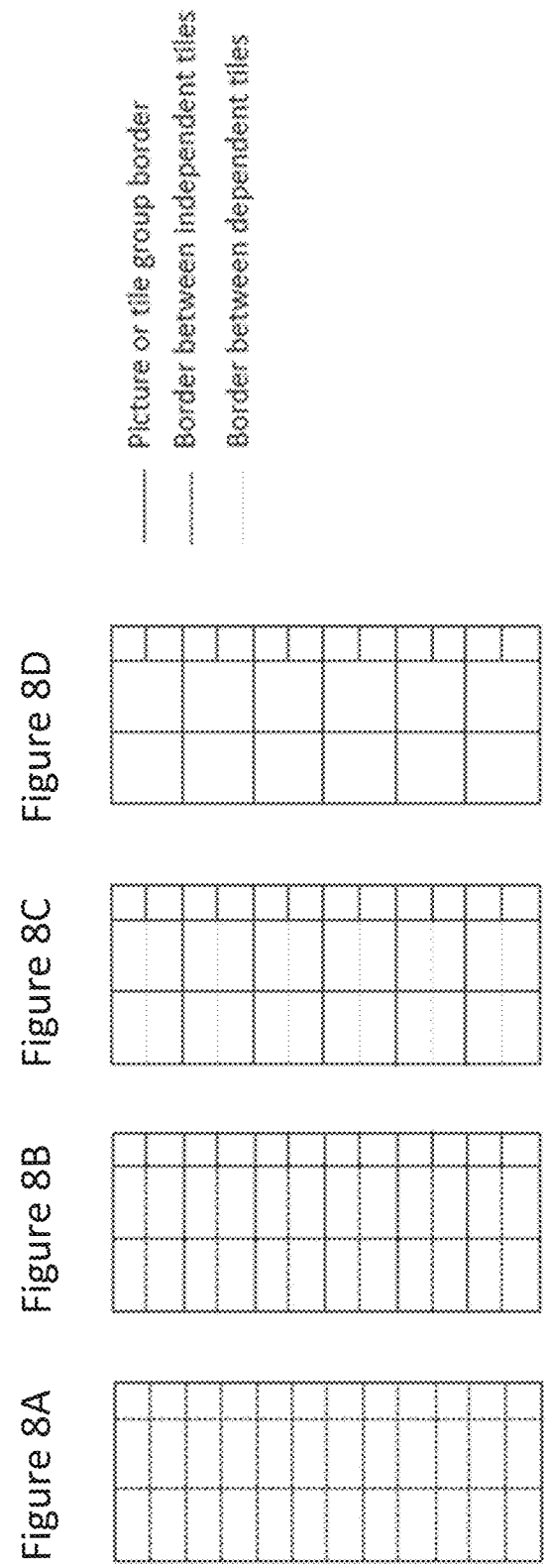

Figure 12

| pic_parameter_set_rbsp( ) { | Descriptor |
|---|---|
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|   ~~}~~ | |
|   ~~if( !single_tile_in_pic_flag ) {~~ | |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     single_tile_per_tile_group_flag | u(1) |
|     if(!single_tile_per_tile_group_flag ) | |
|       rect_tile_group_flag | u(1) |
|     if( rect_tile_group_flag && !single_tile_per_tile_group_flag ) { | |
|       num_tile_groups_in_pic_minus1 | ue(v) |
|       for( i = 0; i <= num_tile_groups_in_pic_minus1; i++ ) { | |
|         if( i > 0 ) | |
|           top_left_tile_idx[ i ] | u(v) |
|         bottom_right_tile_idx[ i ] | u(v) |
|       } | |
|     } | |
|     loop_filter_across_tiles_enabled_flag | u(1) |
|   } | |
|   if( rect_tile_group_flag ) { | |
|     signalled_tile_group_id_flag | u(1) |
|     if( signalled_tile_group_id_flag ) { | |
|       signalled_tile_group_id_length_minus1 | ue(v) |
|       for( i = 0; i <= num_tile_groups_in_pic_minus1; i++ ) | |
|         tile_group_id[ i ] | u(v) |
|     } | |
|   rbsp_trailing_bits( ) | |
| } | |

Figure 13
Table 1

| pic_parameter_set_rbsp( ) { | Descriptor |
|---|---|
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     single_tile_per_tile_group_flag | u(1) |
|     if(!single_tile_per_tile_group_flag ){ | |
|       rect_tile_group_flag | u(1) |
|       for( i = 0; i <= num_tile_groups_in_pic_minus1; i++ ) | |
|         dependent_tiles_in_tile_group_flag[ i ] | u(1) |
|     } | |
|     if( rect_tile_group_flag && !single_tile_per_tile_group_flag ) { | |
|       num_tile_groups_in_pic_minus1 | ue(v) |
|       for( i = 0; i <= num_tile_groups_in_pic_minus1; i++ ) { | |
|         if( i > 0 ) | |
|           top_left_tile_idx[ i ] | u(v) |
|         bottom_right_tile_idx[ i ] | u(v) |
|       } | |
|     } | |
|     loop_filter_across_tiles_enabled_flag | u(1) |
|   } | |
|   if( rect_tile_group_flag ) { | |
|     signalled_tile_group_id_flag | u(1) |
|     if( signalled_tile_group_id_flag ) { | |
|       signalled_tile_group_id_length_minus1 | ue(v) |
|       for( i = 0; i <= num_tile_groups_in_pic_minus1; i++ ) | |
|         tile_group_id[ i ] | u(v) |
|     } | |
|   } | |
|   rbsp_trailing_bits( ) | |
| } | |

Figure 14
Table 2

| pic_parameter_set_rbsp() { | Descriptor |
|---|---|
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     single_tile_per_tile_group_flag | u(1) |
|     if(!single_tile_per_tile_group_flag) | |
|       rect_tile_group_flag | u(1) |
|     if( rect_tile_group_flag && !single_tile_per_tile_group_flag ) { | |
|       num_tile_groups_in_pic_minus1 | ue(v) |
|       for( i = 0; i <= num_tile_groups_in_pic_minus1; i++ ) { | |
|         if( i > 0 ) | |
|           top_left_tile_idx[ i ] | u(v) |
|         bottom_right_tile_idx[ i ] | u(v) |
|       } | |
|     } | |
|     loop_filter_across_tiles_enabled_flag | u(1) |
|   } | |
|   if( rect_tile_group_flag ) { | |
|     for( i = 0; i <= num_tile_groups_in_pic_minus1; i++ ) | |
|       dependent_tiles_in_rect_tile_group_flag[ i ] | u(1) |
|     signalled_tile_group_id_flag | u(1) |
|     if( signalled_tile_group_id_flag ) { | |
|       signalled_tile_group_id_length_minus1 | ue(v) |
|       for( i = 0; i <= num_tile_groups_in_pic_minus1; i++ ) | |
|         tile_group_id[ i ] | u(v) |
|     } | |
|   rbsp_trailing_bits() | |
| } | |

Figure 15
Table 3

| tile_group_header( ) { | Descriptor |
|---|---|
| tile_group_pic_parameter_set_id | ue(v) |
| if( rect_tile_group_flag || NumTilesInPic > 1 ) | |
|    tile_group_address | u(v) |
| if( !rect_tile_group_flag && !single_tile_per_tile_group_flag ) | |
|    num_tiles_in_tile_group_minus1 | ue(v) |
| if( !rect_tile_group_flag ) | |
|    dependent_tiles_in_tile_group_flag | u(1) |
| tile_group_type | ue(v) |
| ... | |
| byte_alignment( ) | |
| } | |

Figure 16
Table 4

| pic_parameter_set_rbsp( ) { | Descriptor |
|---|---|
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     for( i = 0; i < ( num_tile_columns_minus1 + 1 ) * ( num_tile_rows_minus1 + 1 ); i++ ) | |
|       dependent_tile_flag[ i ] | u(1) |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     single_tile_per_tile_group_flag | u(1) |
|     if(!single_tile_per_tile_group_flag ) | |
|       rect_tile_group_flag | u(1) |
|     if( rect_tile_group_flag && !single_tile_per_tile_group_flag ) { | |
|       num_tile_groups_in_pic_minus1 | ue(v) |
|       for( i = 0; i <= num_tile_groups_in_pic_minus1; i++ ) { | |
|         if( i > 0 ) | |
|           top_left_tile_idx[ i ] | u(v) |
|         bottom_right_tile_idx[ i ] | u(v) |
|       } | |
|     } | |
|     loop_filter_across_tiles_enabled_flag | u(1) |
|   } | |
|   if( rect_tile_group_flag ) { | |
|     signalled_tile_group_id_flag | u(1) |
|     if( signalled_tile_group_id_flag ) { | |
|       signalled_tile_group_id_length_minus1 | ue(v) |
|       for( i = 0; i <= num_tile_groups_in_pic_minus1; i++ ) | |
|         tile_group_id[ i ] | u(v) |
|     } | |
|   } | |
|   rbsp_trailing_bits( ) | |
| } | |

Figure 17
Table 5

| | Descriptor |
|---|---|
| pic_parameter_set_rbsp( ) { | |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     single_tile_per_tile_group_flag | u(1) |
|     if(!single_tile_per_tile_group_flag ){ | |
|       rect_tile_group_flag | u(1) |
|       dependent_tiles_in_tile_group_flag | u(1) |
|     } | |
|     if( rect_tile_group_flag && !single_tile_per_tile_group_flag ) { | |
|       num_tile_groups_in_pic_minus1 | ue(v) |
|       for( i = 0; i <= num_tile_groups_in_pic_minus1; i++ ) { | |
|         if( i > 0) | |
|           top_left_tile_idx[ i ] | u(v) |
|         bottom_right_tile_idx[ i ] | u(v) |
|       } | |
|     } | |
|     loop_filter_across_tiles_enabled_flag | u(1) |
|   } | |
|   if( rect_tile_group_flag ) { | |
|     signalled_tile_group_id_flag | u(1) |
|     if( signalled_tile_group_id_flag ) { | |
|       signalled_tile_group_id_length_minus1 | ue(v) |
|       for( i = 0; i <= num_tile_groups_in_pic_minus1; i++ ) | |
|         tile_group_id[ i ] | u(v) |
|     } | |
|   } | |
|   rbsp_trailing_bits( ) | |
| } | |

Figure 18
Table 6

| | Descriptor |
|---|---|
| pic_parameter_set_rbsp( ) { | |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     for( i = 0; i < ( num_tile_columns_minus1 + 1 ) * ( num_tile_rows_minus1 + 1 ); i++ ) { | |
|       if( i % ( num_tile_columns_minus1 + 1 ) ) dependent_on_left_tile_flag[ i ] | u(1) |
|       if( i > num_tile_columns_minus1 ) dependent_on_above_tile_flag[ i ] | u(1) |
|     } | |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     single_tile_per_tile_group_flag | u(1) |
|     if(!single_tile_per_tile_group_flag) | |
|       rect_tile_group_flag | u(1) |
|     if( rect_tile_group_flag && !single_tile_per_tile_group_flag ) { | |
|       num_tile_groups_in_pic_minus1 | ue(v) |
|       for( i = 0; i <= num_tile_groups_in_pic_minus1; i++ ) { | |
|         if( i > 0 ) | |
|           top_left_tile_idx[ i ] | u(v) |
|         bottom_right_tile_idx[ i ] | u(v) |
|       } | |
|     } | |
|     loop_filter_across_tiles_enabled_flag | u(1) |
|   } | |
|   if( rect_tile_group_flag ) { | |
|     signalled_tile_group_id_flag | u(1) |
|     if( signalled_tile_group_id_flag ) { | |
|       signalled_tile_group_id_length_minus1 | ue(v) |
|       for( i = 0; i <= num_tile_groups_in_pic_minus1; i++ ) | |
|         tile_group_id[ i ] | u(v) |
|     } | |
|   rbsp_trailing_bits( ) | |
| } | |

Figure 19
Table 7

| | Descriptor |
|---|---|
| pic_parameter_set_rbsp( ) { | |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     single_tile_per_tile_group_flag | u(1) |
|     if(!single_tile_per_tile_group_flag ){ | |
|       rect_tile_group_flag | u(1) |
|       for( i = 0; i <= num_tile_groups_in_pic_minus1; i++ ) | |
|         dependent_tiles_in_tile_group_flag[ i ] | u(1) |
|         if( dependent_tiles_in_tile_group_flag[ i ] ) dependent_to_above_tile_groups_flag[ i ] | u(1) |
|         if( dependent_tiles_in_tile_group_flag[ i ] ) dependent_to_left_tile_groups_flag[ i ] | u(1) |
|     } | |
|     if( rect_tile_group_flag && !single_tile_per_tile_group_flag ) { | |
|       num_tile_groups_in_pic_minus1 | ue(v) |
|       for( i = 0; i <= num_tile_groups_in_pic_minus1; i++ ) { | |
|         if( i > 0 ) | |
|           top_left_tile_idx[ i ] | u(v) |
|         bottom_right_tile_idx[ i ] | u(v) |
|       } | |
|     } | |
|     loop_filter_across_tiles_enabled_flag | u(1) |
|   } | |
|   if( rect_tile_group_flag ) { | |
|     signalled_tile_group_id_flag | u(1) |
|     if( signalled_tile_group_id_flag ) { | |
|       signalled_tile_group_id_length_minus1 | ue(v) |
|       for( i = 0; i <= num_tile_groups_in_pic_minus1; i++ ) | |
|         tile_group_id[ i ] | u(v) |
|     } | |
|   } | |
|   rbsp_trailing_bits( ) | |
| } | |

Figure 20
Table 8

| pic_parameter_set_rbsp( ) { | Descriptor |
|---|---|
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     single_tile_per_tile_group_flag | u(1) |
|     if(!single_tile_per_tile_group_flag ){ | |
|       rect_tile_group_flag | u(1) |
|       for( i = 0; i <= num_tile_groups_in_pic_minus1; i++ ) { | |
|         dependent_tiles_in_tile_group_flag[ i ] | u(1) |
|     } | |
|     if( rect_tile_group_flag && !single_tile_per_tile_group_flag ) { | |
|       num_tile_groups_in_pic_minus1 | ue(v) |
|       for( i = 0; i <= num_tile_groups_in_pic_minus1; i++ ) { | |
|         if( i > 0 ) | |
|           top_left_tile_idx[ i ] | u(v) |
|         bottom_right_tile_idx[ i ] | u(v) |
|         if(dependent_tiles_in_tile_group_flag[ i ]) dependent_tile_group_flag[ i ] | u(1) |
|       } | |
|     } | |
|     loop_filter_across_tiles_enabled_flag | u(1) |
|   } | |
|   if( rect_tile_group_flag ) { | |
|     signalled_tile_group_id_flag | u(1) |
|     if( signalled_tile_group_id_flag ) { | |
|       signalled_tile_group_id_length_minus1 | ue(v) |
|       for( i = 0; i <= num_tile_groups_in_pic_minus1; i++ ) | |
|         tile_group_id[ i ] | u(v) |
|     } | |
|   rbsp_trailing_bits( ) | |
| } | |

METHODS PROVIDING ENCODING/DECODING OF DEPENDENT/INDEPENDENT PARTITIONS AND RELATED DEVICES

CROSS REFERENCE TO RELATED APPLICATIONS

This application is a 35 U.S.C. § 371 national stage application of PCT International Application No. PCT/SE2020/050244 filed on Mar. 5, 2020, which claims the benefit of U.S. Provisional Patent Application Ser. No. 62/815,548, filed on Mar. 8, 2019, the disclosures and content of which are incorporated by reference herein in their entireties.

TECHNICAL FIELD

The present disclosure relates generally to communication of pictures/video, and more particularly to methods providing encoding and/or decoding of pictures and/or video and related devices.

BACKGROUND

HEVC and VVC are discussed below.

High Efficiency Video Coding (HEVC), a.k.a. H.265, is a block-based video codec standardized by ITU-T and MPEG that utilizes both temporal and spatial prediction. Spatial prediction is achieved using intra (I) prediction from within the current picture. Temporal prediction is achieved using inter (P) or bi-directional inter (B) prediction on the block level using previously decoded reference pictures. The difference between the original pixel data and the predicted pixel data, referred to as the residual, is transformed into the frequency domain, quantized and then entropy coded before transmitted together with necessary prediction parameters such as prediction mode and motion vectors, also entropy coded. By quantizing the transformed residuals, a tradeoff between bitrate and quality of the video may be controlled. The level of quantization is determined by the quantization parameter (QP). The decoder performs entropy decoding, inverse quantization and inverse transformation to obtain the residual, and then adds the residual to an intra or inter prediction to reconstruct a picture.

MPEG and ITU-T is working on the successor to HEVC within the Joint Video Exploratory Team (JVET). The name of this video codec under development is Versatile Video Coding (VCC).

QTBT is discussed below.

HEVC uses a block structure where each top-level coding block, i.e. the largest block in the coding block partitioning, referred to as the coding tree unit (CTU), may be partitioned by a quad tree (QT) structure. The following coding block partitions, referred to as coding units (CUs) can be recursively further partitioned into smaller equally sized CUs with the quad tree structure down to block size 8×8. In the current version of VVC, the block structure is a bit different compared to HEVC. The block structure in VVC is referred to as quadtree plus binary tree plus ternary tree block structure (QTBT+TT). A CU in QTBT can have either square or rectangular shapes. A coding tree unit (CTU) is first partitioned by a quad tree structure as in HEVC. Then it may be further partitioned with equally sized partitions either vertically or horizontally in a binary structure to form coding blocks, referred to as coding units (CUs). A block could thus have either a square or rectangular shape. The depth of the quad tree and binary tree can be set by the encoder in the bitstream. An example of dividing a CTU using QTBT is illustrated in FIG. 1. TT adds the possibility to divide a CU into three partitions instead of two equally sized partitions; increasing the possibilities to use a block structure that better fits the content structure in a picture.

FIG. 1 illustrates an example of partitioning a CTU into CUs using QTBT.

CABAC is discussed below.

Context Adaptive Binary Arithmetic Coding (CABAC) is an entropy coding tool used in HEVC and VVC. CABAC encodes binary symbols, which keeps the complexity low and allows modelling of probabilities for more frequently used bits of a symbol. The probability models are selected adaptively based on local context, since coding modes are usually well correlated locally. The state of the CABAC machine, including the probabilities of the local context, is continuously updated based on the previous coded blocks. The CABAC states are reset for each picture, independent slice or tile.

Intra random access point (IRAP) pictures and the coded video sequence (CVS) are discussed below.

For single layer coding in HEVC, an access unit (AU) is the coded representation of a single picture. An AU may consist of several video coding layer (VCL) NAL units as well as non-VCL NAL units.

An Intra random access point (IRAP) picture in HEVC is a picture that does not refer to any pictures other than itself for prediction in its decoding process. The first picture in the bitstream in decoding order in HEVC must be an IRAP picture but an IRAP picture may additionally also appear later in the bitstream. HEVC specifies three types of IRAP pictures, the broken link access (BLA) picture, the instantaneous decoder refresh (IDR) picture and the clean random access (CRA) picture.

A coded video sequence (CVS) in HEVC is a series of access units starting at an IRAP access unit up to, but not including the next IRAP access unit in decoding order. A CRA may or may not start a CVS while the BLA and IDR types always start a new CVS.

NAL units are discussed below.

Both HEVC and VVC define a Network Abstraction Layer (NAL). All the data, i.e. both Video Coding Layer (VCL) or non-VCL data in HEVC and VVC is encapsulated in NAL units. NAL units are always byte aligned and can be seen as data packets. A VCL NAL unit contains data that represents picture sample values. A non-VCL NAL unit contains additional associated data such as parameter sets and supplemental enhancement information (SEI) messages. The NAL unit in HEVC begins with a header which specifies the NAL unit type of the NAL unit that identifies what type of data is carried in the NAL unit, the layer ID and the temporal ID for which the NAL unit belongs to. The NAL unit type is transmitted in the nal_unit_type codeword in the NAL unit header and the type indicates and defines how the NAL unit should be parsed and decoded. The rest of the bytes of the NAL unit is payload of the type indicated by the NAL unit type. A bitstream consists of a series of concatenated NAL units. A bitstream consists of a series of concatenated NAL units.

Parameter Sets are discussed below.

HEVC specifies three types of parameter sets, the picture parameter set (PPS), the sequence parameter set (SPS) and the video parameter set (VPS). The PPS contains data that is common for a whole picture, the SPS contains data that is common for a coded video sequence (CVS) and the VPS contains data that is common for multiple CVSs.

Tiles are discussed below.

The HEVC video coding standard includes a tool called tiles that divides a picture into rectangular spatially independent regions. Using tiles, a picture in HEVC can be partitioned into rows and columns of samples where a tile is an intersection of a row and a column. The tiles in HEVC are always aligned with CTU boundaries.

Slices in HEVC are discussed below.

The concept of slices in HEVC divides the picture into coded slices, where each slice is read in raster scan order in units of CTUs. A slice in HEVC may be either an independent slice or a dependent slice for which the values of some syntax elements of the slice header are inferred from the values for the preceding independent slice in decoding order. Each slice is encapsulated in its own NAL unit. Different coding types could be used for slices of the same picture, i.e. a slice could either be an I-slice, P-slice or B-slice. The main purpose of slices is to enable resynchronization in case of data loss.

Tile groups in VVC are discussed below.

The draft VVC specification does not include slices but a similar concept called tile groups. In HEVC a tile may contain one or more slices, or a slice may contain one or more tiles, but not both of those. In VVC, the concept is more straightforward; a tile group may contain one or more complete tiles. A tile group is used to group multiple tiles to reduce the overhead of each tile. Each tile group is encapsulated in its own NAL unit. For a picture, the tile groups may either be of rectangular shape or comprise one or more tiles in raster scan order. A rectangular tile group consists of M×N tiles where M is the number of tiles vertically and N the number of tiles horizontally in the tile group. A tile group in the VVC draft breaks prediction similar to a tile in HEVC.

Tile grouping as in JVET-M0853 are discussed below.

At the 13th JVET meeting in Marrakech in January 2019, rectangular tile grouping was adopted according to the JVET-M0853 proposal.

The proposed text as in JVET-M0853 is shown in the table of FIG. 12.

Semantics for new/modified elements of FIG. 12 are provided below.

single_tile_per_tile_group equal to 1 specifies that each tile group that refers to this PPS includes one tile. single_tile_per_tile_group equal to 0 specifies that a tile group that refers to this PPS may include more than one tile.

rect_tile_group_flag equal to 0 specifies that tiles within each tile group are in raster scan order and the tile group information is not signalled in PPS. rect_tile_group_flag equal to 1 specifies that tiles within each tile group cover a rectangular region of the picture and the tile group information is signalled in the PPS. When single_tile_per_tile_group_flag is equal to 1 rect_tile_group_flag is inferred to be equal to 1.

num_tile_groups_in_pic_minus1 plus 1 specifies the number of tile groups in each picture referring to the PPS. The value of num_tile_groups_in_pic_minus1 shall be in the range of 0 to (NumTilesInPic−1), inclusive. When not present and single_tile_per_tile_group_fla is equal to 1, the value of num_tile_groups_in_pic_minus1 is inferred to be equal to (NumTilesInPic−1).

top_left_tile_idx[i] specifies the tile index of the tile located at the top-left corner of the i-th tile group. The value of top_left_tile_idx[i] shall not be equal to the value of top_left_tile_idx[j] for any i not equal to j. When not present, top_left_tile_idx[i] is inferred to be equal to i. The length of the top_left_tile_idx[i] syntax element is Ceil(Log2(NumTilesInPic) bits.

bottom_right_tile_idx[i] specifies the tile index of the tile located at the bottom-right corner of the i-th tile group. When single_tile_per_tile_group_flag is equal to 1 bottom_right_tile_idx[i] is inferred to be equal to top_left_tile_idx[i]. The length of the bottom_right_tile_idx[i] syntax element is Ceil(Log2(NumTilesInPic)) bits.

It may be a requirement of bitstream conformance that any particular tile shall only be included in one tile group.

The variable NumTilesInTileGroup[i], which specifies the number of tiles in the tile group, and related variables, are derived as follows:

deltaTileIdx[i]=bottom_right_tile_idx[i]−top_right_tile_idx[i]

NumTileRowsInTileGroupMinus1[i]=(deltaTileIdx[i]/(num_tile_columns_minus1+1))

NumTileColumnsInTileGroupMinus1[i]=(deltaTileIdx[i]%(num_tile_columns_minus1+1))

NumTilesInTileGroup[i]=(NumTileRowsInTileGroupMinus1[i]+1)*(NumTileColumnsInTileGroupMinus1[i]+1)

signalled_tile_group_id_flag equal to 1 specifies that the tile group ID for each tile group is signalled. signalled_tile_group_index_flag equal to 0 specifies that tile group IDs are not signalled. When rect_tile_group_flag is equal to 0, the value of signalled_tile_group_index_flag is inferred to be equal to 0.

signalled_tile_group_id_length_minus1 plus 1 specifies the number of bits used to represent the syntax element tile_group_id[i] when present, and the syntax element tile_group_address in tile group headers. The value of signalled_tile_group_index_length_minus1 shall be in the range of 0 to 15, inclusive. When not present, the value of signalled_tile_group_index_length_minus1 is inferred to be equal to Ceil(Log2(num_tile_groups_in_pic_minus1+1))−1.

tile_group_id[i] specifies the tile group ID of the i-th tile group. The length of the tile_group_id[i] syntax element is tile_set_id_length_minus1+1 bits. When not present, tile_group_id[i] is inferred to be equal to i, for each i in the range of 0 to num_tile_groups_in_pic_minus1, inclusive.

In the present disclosure, syntax examples are shown relative to the proposed text in JVET-M0853 since at the time of writing this text was the most recent VVC tile specification text.

Segment groups, segments, units and partitions are discussed below.

Here we describe segment groups, segments and units. The term segment is used as a more general term than tiles, since embodiments of the present disclosure may be applied to different kinds of picture partitioning schemes and not only tile partitions known from HEVC and the VVC draft. In this section, tile is one embodiment of a segment, but there may also be other segment embodiments.

FIGS. 2A, 2B, and 2C illustrates a picture partition.

FIGS. 2 A, 2B, and 2C shows a picture (10) of a video stream and an exemplary partitioning of the picture into units (8), segments (11) and segment groups (12). FIG. 2A shows a picture (10) that consist of 64 units (8). FIG. 2B shows the segment structure (13) of the same picture (10) consisting of 16 segments (11). The segment structure (13) is shown by dashed lines. Each segment (11) consists of a number of units. A segment can either consist of an integer number of complete units or a combination of complete and partial units. A number of segments form a segment group.

FIG. 2C shows the segment group partitioning of the same picture (10) which consist of 8 segment groups. The segment group may consist of segments in raster scan order. Alternatively, the segment group may consist of any group of segments that together form a rectangle. Alternatively, the segment group may consist of any subset of segments.

A segment may be equivalent to a tile. A segment group may be equivalent to a tile group. In this description, "tile" and "segment" can be used interchangeably. We also define in this description the term "partition" to mean "segment or segment group". A partition may thus be either a segment or a segment group. The term unit may be equivalent to a CTU or in more general terms a block.

Encoding/decoding using known tile/segment partitioning, may reduce compression efficiency and/or cause tiling artifacts.

SUMMARY

According to some embodiments of inventive concepts, methods are provided to decode a picture from a bitstream. A partitioning structure of the picture is determined, wherein the partitioning structure defines at least first and second partitions of the picture. At least one dependency syntax element is decoded from the bitstream, and whether the second partition is dependent on or independent of the first partition is determined based on the at least one dependency syntax element. The picture is decoded from the bitstream based on determining whether the second partition of the picture is dependent on or independent of the first partition of the picture.

According to some other embodiments of inventive concepts, methods are provided to encode a picture for a bitstream. A partitioning structure of the picture is defined, wherein the partitioning structure includes at least first and second partitions of the picture. Whether the second partition is dependent on or independent of the first partition is determined, and at least one dependency syntax element may be encoded for the bitstream, wherein the at least one dependency syntax element specifies whether the second partition is dependent on or independent of the first partition. The first and second partitions are encoded into the bitstream based on determining the partitioning structure and based on determining whether the second partition of the picture is dependent on or independent of the first partition of the picture.

Some embodiments disclosed herein may enable a more flexible partitioning of a picture into regions where unnecessary breaking of parsing and prediction may be reduced, reduce artifacts at decoding borders, reduce complexity, and/or improve efficiency of compression.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a diagram illustrating an example of partitioning a CTU into CUs using QTBT;

FIGS. 2A, 2B, and 2C are diagrams illustrating a picture partition;

FIGS. 3A and 3B are examples of tile structures;

FIGS. 8A, 8B, 8C, and 8D illustrate a petitioning structure of FIG. 5 using Embodiment 6 according to some embodiments of inventive concepts;

FIG. 12 is a table illustrating proposed text as in JVET-M0853;

FIG. 13 is a table illustrating a syntax for a first example of Embodiment 1 according to some embodiments of inventive concepts;

FIG. 14 is a table illustrating a PPS syntax for example 2 according to some embodiments of inventive concepts;

FIG. 15 is a table illustrating a tile group header syntax for a second example of Embodiment 2 according to some embodiments of inventive concepts;

FIG. 16 is a table illustrating a PPS syntax for a second example of Embodiment 2 according to some embodiments of inventive concepts;

FIG. 17 is a table illustrating a syntax for Embodiment 2 according to some embodiments of inventive concepts;

FIG. 18 is a table illustrating a PPS syntax for an example of Embodiment 8 according to some embodiments of inventive concepts;

FIG. 19 is a table illustrating a syntax for an example of Embodiment 7 according to some embodiments of inventive concepts;

FIG. 20 is a table illustrating a syntax for an example of Embodiment 1 according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 21:
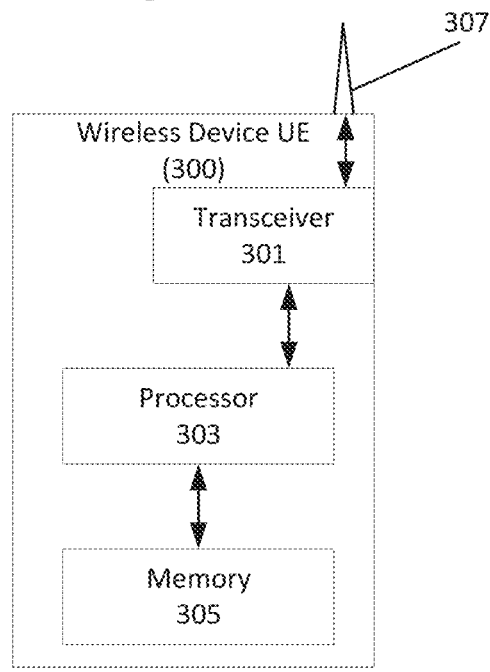
FIG. 21 is a block diagram illustrating a mobile terminal UE according to some embodiments of inventive concepts.

FIG. 21 is a block diagram illustrating elements of a wireless device UE 300 (also referred to as a mobile terminal, a mobile communication terminal, a wireless communication device, a wireless terminal, a wireless communication terminal, user equipment, UE, a user equipment node/terminal/device, etc.) configured to provide wireless communication according to embodiments of inventive concepts. As shown, wireless device UE may include an antenna 307, and transceiver circuitry 301 (also referred to as a transceiver) including a transmitter and a receiver configured to provide uplink and downlink radio communications with a base station(s) of a radio access network. Wireless device UE may also include processing circuitry 303 (also referred to as a processor coupled to the transceiver circuitry, and memory circuitry 305 (also referred to as memory coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Wireless device UE may also include an interface (such as a user interface) coupled with processing circuitry 303, and/or wireless device UE may be incorporated in a vehicle.

As discussed herein, operations of wireless device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to encoding/decoding/transmitting/receiving a bitstream include a picture/video).

Figure 22:
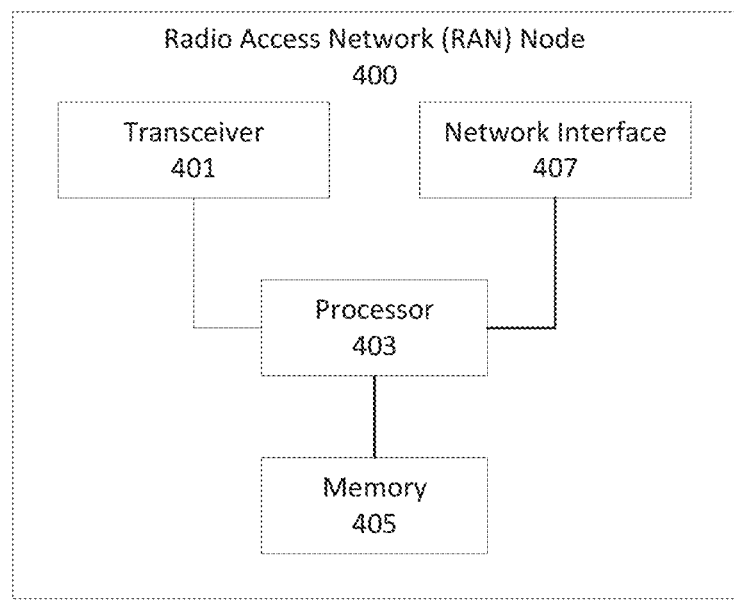
FIG. 22 is a block diagram illustrating a radio access network RAN node (e.g., a base station eNB/gNB) according to some embodiments of inventive concepts.

FIG. 22 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. As shown, the RAN node may include transceiver circuitry 401 (also referred to as a transceiver) including a transmitter and a receiver configured to provide uplink and downlink radio communications with mobile terminals. The RAN node may include network interface circuitry 407 (also referred to as a network interface) configured to provide communications with other nodes (e.g., with other base stations) of the RAN and/or core network CN. The network node may also include a processing circuitry 403 (also referred to as a processor, e.g., corresponding to processing circuitry QQ170) coupled to the transceiver circuitry, and a memory circuitry 405 (also referred to as memory) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations.

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 23:
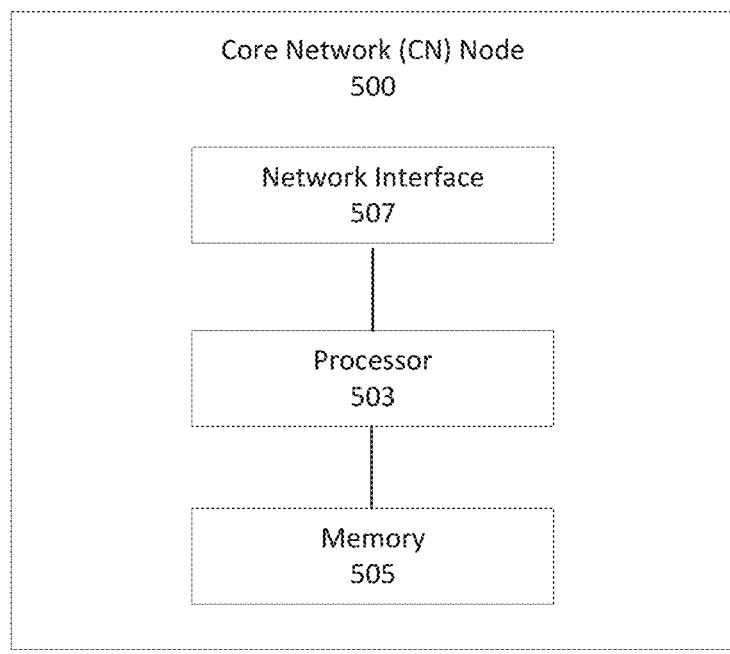
FIG. 23 is a block diagram illustrating a core network node (e.g., an AMF node, an SMF node, etc.) according to some embodiments of inventive concepts.

FIG. 23 is a block diagram illustrating elements of a core network CN node (e.g., an SMF node, an AMF node, etc.) of a communication network configured to provide cellular communication according to embodiments of inventive concepts. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations.

Figure 24:
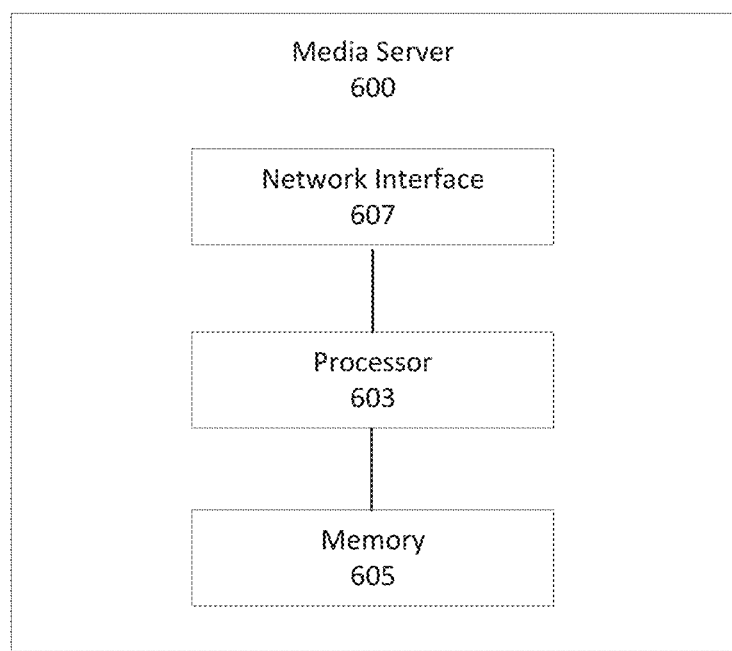
FIG. 24 is a block diagram illustrating a media server according to some embodiments of inventive concepts.

FIG. 24 is a block diagram illustrating elements of a media server 600 configured to provide media content according to embodiments of inventive concepts. As shown, the server may include network interface circuitry 607 (also referred to as a network interface), for example, configured to provide media content (e.g., pictures and/or video) through a communication network (e.g., a wireless communication network including one or more RAN nodes 400 and/or CN nodes 500) to a wireless device 300. The server may also include processing circuitry 603 (also referred to as a processor) coupled to the network interface circuitry, and memory circuitry 605 (also referred to as memory) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that separate memory circuitry is not required.

As discussed herein, operations of the server may be performed by processing circuitry 603 and/or network interface circuitry 607. For example, processing circuitry 603 may control network interface circuitry 607 to transmit communications through network interface circuitry 607 through one or more network nodes (e.g., RAN and/or CN nodes) to a wireless device and/or to receive communications through network interface circuitry from one or more network nodes (e.g., RAN and/or CN nodes) from a wireless device. Moreover, modules may be stored in memory 605, and these modules may provide instructions so that when instructions of a module are executed by processing circuitry 603, processing circuitry 603 performs respective operations (e.g., operations discussed below with respect to Example Embodiments relating to encoding/decoding/transmitting/receiving a bitstream include a picture/video).

The tile tool in HEVC and VVC enables partitioning of a picture into independent regions. Tile boundaries break parsing and spatial prediction dependencies so that a tile can be processed independently from other tiles.

Tiles in its current form in VVC (and HEVC) may be restricted by the use of tile rows and tile columns. This means that all tile boundaries may be required to span across the entire picture; from left to right or from top to bottom. This may reduce/limit the flexibility of tiles. For example, the tile structure in FIG. 3A is not supported in HEVC and VVC.

FIG. 3A illustrates an example of a tile structure not supported in HEVC and VVC working draft, and FIG. 3B illustrates a closest tile structure to 3a using tile rows and tile columns as supported in HEVC and VVC working draft 3.

To virtually support the tile structure in FIG. 3A using HEVC or VVC, one may specify the tile structure shown in FIG. 3B. However, the tile structure in FIG. 3B contains a lot more tile boundaries which harms compression efficiency and may cause unnecessary tiling artifacts. Also, if the tiles are to be completely spatially independent, VVC may only allow for either enabling or disabling in-loop filtering dependencies for all tile boundaries of a picture using the loop_filter_across_tiles_enabled_flag. Therefore, a lot of unnecessary in-loop filtering restrictions may occur.

Figure 4:
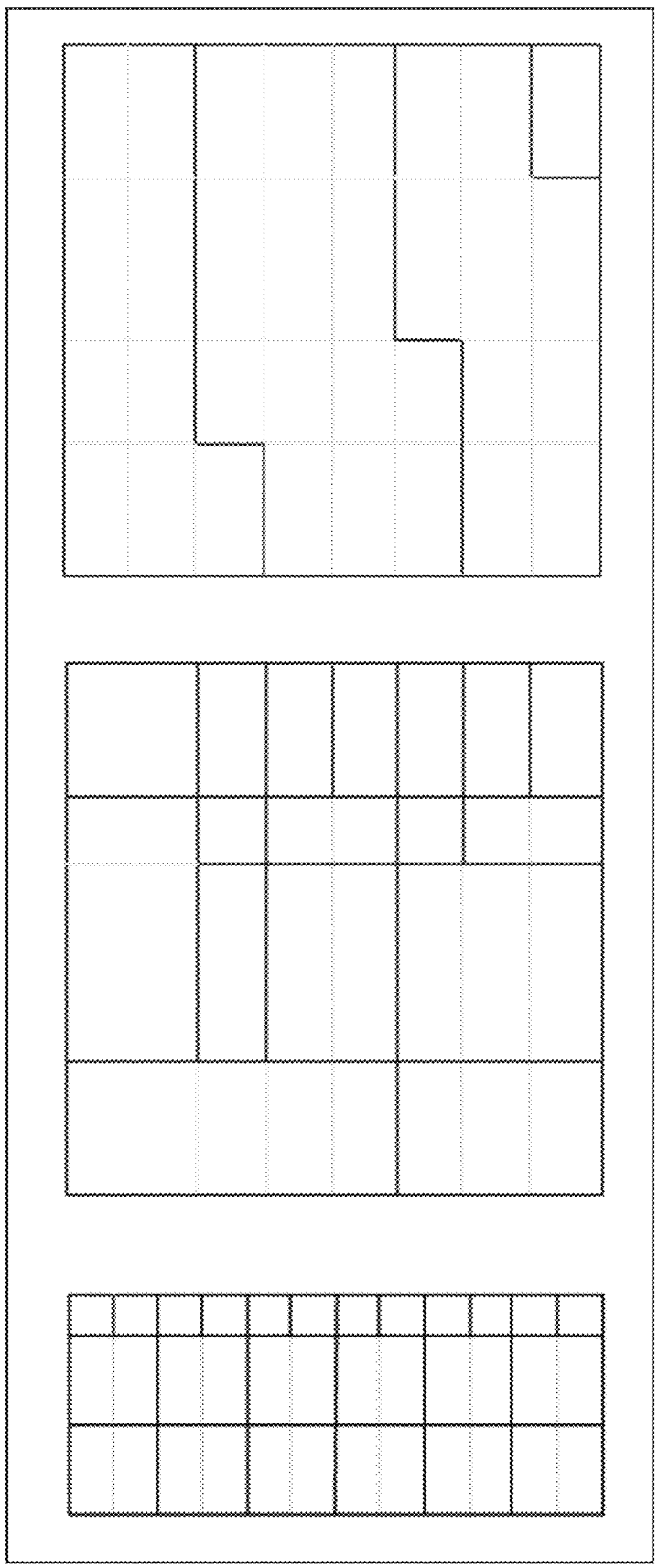
FIG. 4 is an example of tile group partitioning.

Partitioning the picture into independent regions is extended in VVC by introducing the tile group concept. A picture may comprise either rectangular tile groups or raster scan tile groups, but not both types in the same picture. Rectangular tile groups enable partitioning of pictures into non-overlapping rectangular regions with some constraints, and raster scan tile groups comprise one or more tiles in raster scan order. FIG. 4 illustrates some tile group partitioning examples which are supported in the current VVC draft specification. Gray lines are tile borders and black lines are tile and tile group borders. The two leftmost examples in FIG. 4 are examples of rectangular tile groups while the rightmost example is an example of raster scan tile groups.

However, this flexibility in partitioning does not change the mutual relation of tiles since parsing and spatial prediction dependencies are still constrained between all tiles even those in the same tile group. In other words, in the current VVC draft, regardless of whether any two tiles are in the same tile group or not, there are no prediction dependencies between them.

Figure 5:
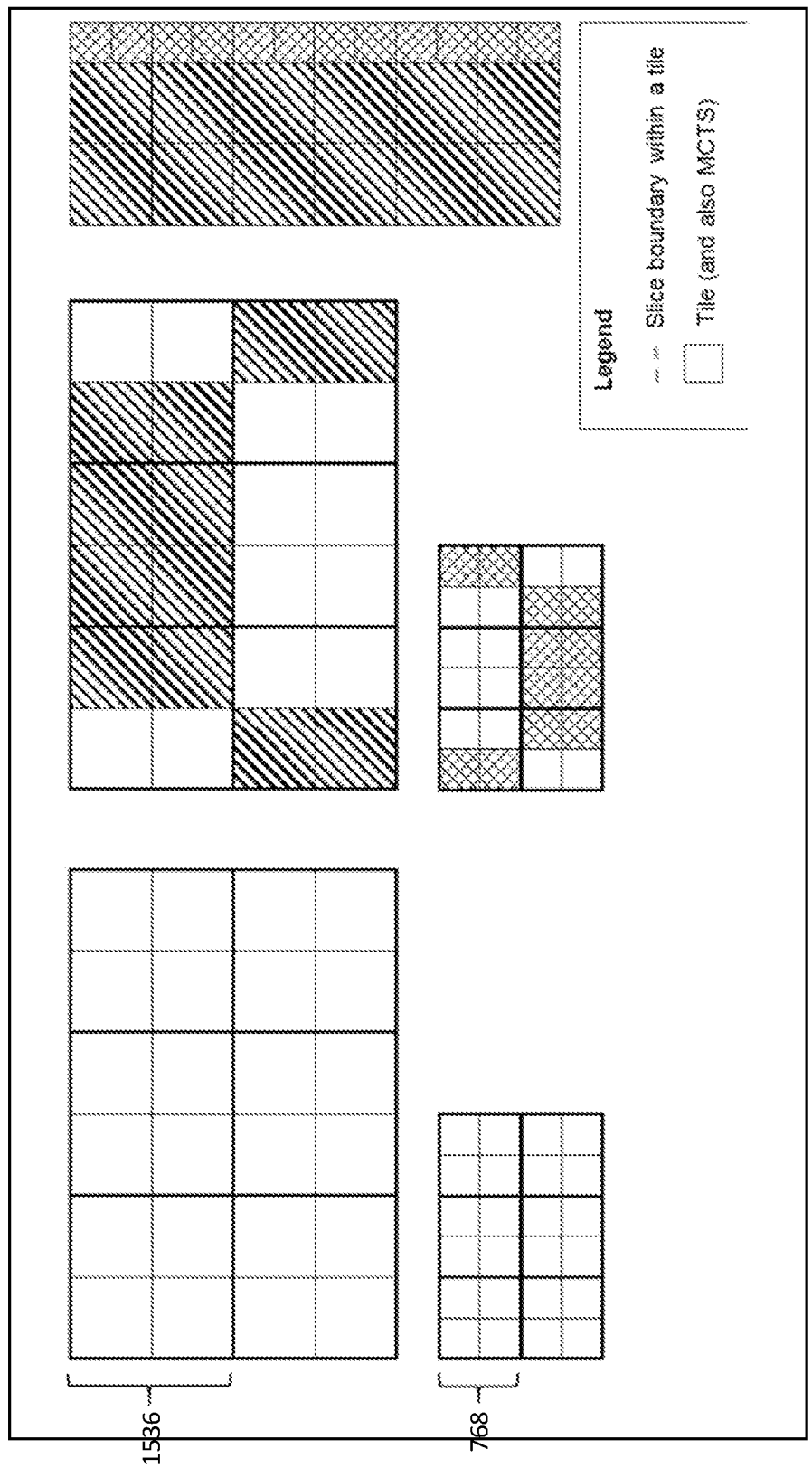
FIG. 5 is an example of MCTS-based RWMR viewport-dependent 360 degree streaming.

FIG. 5 shows a cube map projection partitioning example from section 2.5 of JVET-K0300-v1. The JVET-K0300-v1 document reports that the example is included into clauses D.6.3 and D.6.4 of OMAF and adopted into the VR Industry Forum Guidelines. This and other 360 video streaming embodiments may use partitions of different resolutions which in HEVC may require a mix of tiles and slices. As can be seen to the right of FIG. 5, the rightmost tile column consisting of small tiles is realized by splitting tiles using HEVC slices. The mix of slices and tiles is not supported in VVC, and so the example in FIG. 5 is not supported.

FIG. 5 illustrates an example of MCTS-based RWMR viewport-dependent 360° streaming.

In applications where tiles within one tile group are naturally dependent, it is beneficial to be able to treat the region specified by the tile group as one entity and allow for parsing and spatial prediction dependencies between tiles within the tile group. Therefore, it is beneficial to define a mechanism to selectively allow for parsing and spatial prediction dependencies between tiles.

The proposed embodiments may provide mechanisms to support dependent tiles. With the proposed embodiments, parsing and spatial prediction dependencies may be allowed between dependent tiles in a tile group. This is proposed to be supported for both the rectangular tile group case as well as for the raster scan tile group case. This may be achieved by one or more syntax elements such as for instance a flag in a parameter set which activates or deactivates dependencies between the tiles that belong to the same tile group. In some versions of inventive concepts, the one or more syntax elements are decoded for each tile group. In one version, there is one syntax element for all tile groups in the picture, group of pictures, CVS or entire bitstream.

Proposed embodiments may also provide mechanisms to adjust the mutual relation between neighboring tile groups. This may be achieved by one or more syntax elements for instance a flag in a parameter set which allows for instance prediction dependencies between two neighboring tile groups.

Tile groups in VVC group multiple tiles together and puts them into a single packetization unit called NAL unit. However, tiles in a tile group in the current VVC draft are treated as independent regions which means that the boundaries between them break parsing and spatial prediction dependencies. Proposed embodiments may enable a more flexible partitioning of the picture into regions where unnecessary breaking of parsing and prediction dependencies can be reduced/avoided.

Examples of other advantages in addition to the partitioning flexibility are as follows:
  Reducing/Avoiding artifacts at the tile borders internal to the tile group.
  Complexity reduction since no padding or border treatments may be needed at the tile borders internal to the tile group.

Compression efficiency improvements since prediction dependencies may be allowed between neighboring tiles in the tile group.

Supporting virtual tiles of different spatial sizes. This supports e.g. the example in FIG. 5 with low bit rate overhead.

Some embodiments of inventive concepts may extend improvements to the borders between the tile groups which in the current VVC draft break parsing and spatial prediction dependencies. Proposed embodiments may provide syntax and semantics for cases where two neighboring tile groups may have prediction dependencies.

The VVC tile grouping concept can be enhanced by defining rules and mechanism such as dependency rules and mechanisms between tiles in the same tile group and dependency rules and mechanisms between the tile groups.

Some embodiments of inventive concepts may introduce concepts of dependent partitions and may signal one or more syntax elements in the bitstream that specify the dependency properties between partitions. Partitions are considered independent when they can be decoded independently from other partitions. The partitions are considered independent unless this state of independence is overwritten for instance by one or more syntax elements decoded from the bitstream. A subset of partitions may be made dependent by decoded syntax elements in the sense that the partitions become available to each other for prediction and that states in one partition depend on states in another partition. Examples of the former includes inter and/or intra prediction across partition boundaries. An example of the latter is to update CABAC states across partition boundaries such that the CABAC state of a block in one partition depends on the CABAC state of a block in another partition within the same subset.

The syntax elements used for specifying dependencies between the partitions can alternatively be referred to as merge syntax elements.

Figure 6A:
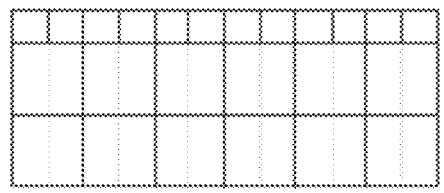
FIGS. 6A, 6B, and 6C illustrate an example of partitioning according to some embodiments of inventive concepts.
Figure 6B:
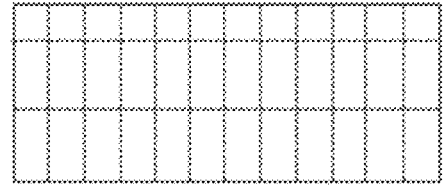
Figure 6C:
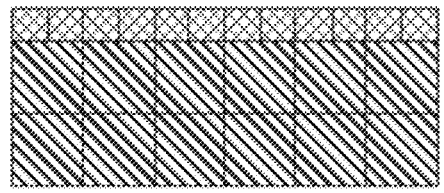

Using proposed embodiments, the partitioning example in FIG. 5 can be achieved by proper grouping of the tiles into tile groups and carefully specifying tile dependencies within the tile groups. One exemplary embodiment is illustrated in FIGS. 6A, 6B, and 6C. This embodiment may provide a desired partitioning by the following operations: first partitioning the picture into a tile grid (as shown in FIG. 6B), second grouping of tiles into tile groups (black solid lines in FIG. 6C) and third specifying the tiles in some of the tile groups as dependent tiles. The border between the dependent tiles are shown with gray lines in FIG. 6C. By making tiles in some tile groups dependent, the desired partitioning of FIG. 6A is achieved.

FIG. 6A illustrates an example of a cube map projection partition, and FIGS. 6B and 6C illustrate proposed embodiments to support this partitioning.

Embodiment A is discussed below with respect to general concepts of some embodiments.

In this embodiment, the decoding of one or more pictures comprises deriving dependency statuses between multiple partitions. The derivation is done by first decoding a partitioning structure that one or more picture consists of, and then deriving dependency statuses between partitions by decoding one or more syntax elements in the bitstream. The dependencies may be prediction dependencies and they may be specified using one or more syntax elements such as flags, in a parameter set such as a picture parameter set or a sequence parameter set. Syntax element(s) used for specifying the dependencies may alternatively be called merge syntax element(s).

In one example, the partitions are tiles, and the picture is partitioned into tiles using tile rows and tile columns and the tile dependencies are signalled in the bitstream. If the tile dependency between two neighboring tiles is signalled such that the tiles are dependent, prediction is allowed across the tile boundary between the tiles. If the tiles are signalled to be independent, prediction is not allowed across the tile boundary.

A decoder may perform all or a subset of the following operations/steps for this embodiment to decode a picture:

1. Decode a partitioning structure from one or more syntax elements in the bitstream. The syntax is preferably located in a parameter set. The partition syntax may divide the picture into rows and columns where a partition may be an intersection between one row and one column such as the tile partitioning in HEVC.
2. Derive the dependencies between partitions in the picture by decoding one or more syntax elements from the bitstream. The picture may contain at least two neighboring partitions S1 and S2 that are specified by the syntax elements to be dependent and the picture may contain at least two partitions S3 and S4 that are specified to be independent and at least one of S3 and S4 are different from S1 and S2.
3. Use the derived dependencies when decoding the picture.

Details on dependent and independent partitions are discussed below.

In operation/step 3 above, the at least two neighboring partitions S1 and S2 are dependent such that a subset S of the list from 1 to 11 below is allowed across the partition boundary between S1 and S2 where partition S1 is decoded before partition S2 and there is a block B1 in S1 and a block B2 in S2 that are spatial neighbors:

1. Intra sample prediction of B2 may be done by predicting sample values in B2 from sample values in B1
2. The intra mode for B2 may be predicted from the Intra mode of B1
3. The motion vector for B2 may be predicted from a motion vector of B1 and/or a reference picture used for B1
4. The reference picture to use for Inter prediction of B2 may be predicted from the reference picture used for B1
5. The motion vector to use for B2 may be selected from a motion vector in B1, for example by a merge process
6. The quantization parameter value to use for B2 may be predicted or copied from a quantization parameter value of B1
7. The derivation of whether the inverse transform for B2 is skipped or not may depend on whether the inverse transform for B1 was skipped or not and/or other properties of B1
8. The derivation of whether there are any transform coefficients in B2 may depend on whether there are any transform coefficients in B1 or not and/or other properties of B1
9. The CABAC state for decoding of a syntax element for B2 may depend on properties of B1 such as but not limited to what mode B1 was coded as, what motion vector B1 uses, what reference picture B1 uses, what coefficient values there are in B1 and what state CABAC was in for B1.
10. The context to use for decoding of a syntax element for B2 may depend on properties of B1 such as but not limited to what mode B1 was coded as, what motion vector B1 uses, what reference picture B1 uses, what coefficient values there are in B1.

11. Filtering of samples in B2 may depend on sample values in B1. Filtering may for instance comprise in-loop deblocking filtering, sample adaptive offset (SAO) filtering, Adaptive loop filtering (ALF), bilateral filtering, or Hadamard filtering.

In operation/step 3 above, the at least two partitions S3 and S4 are independent such that the subset S of the list from 1 to 11 above is not allowed for any pair of blocks B3 and B4 across the partition boundary between S3 and S4 where partition S3 is decoded before partition S4 and block B3 in S3 and block B4 in S4 are spatial neighbors.

Embodiment B is discussed below with respect to Flag per partition.

In this embodiment the dependencies between partitions is signalled using one or more syntax elements per partition, a group of partitions or a set of partitions.

An Example 1 is discussed below.

In one example, the picture is partitioned into tiles using tile rows and tile columns and then the tiles are grouped into tile groups and a flag per tile group is signalled and decoded such that if the value of the flag has one value (e.g. is equal to 0) it specifies that the tiles in that tile group are independent and if the value of the flag has another value (e.g. is equal to 1) it specifies that the tiles in that tile group may be dependent on each other.

A decoder may perform all or a subset of the following operations/steps for this embodiment to decode a picture:

1. Decode a tile partitioning structure from one or more syntax elements in the bitstream. The syntax is preferably located in a parameter set. The syntax may divide the picture into rows and columns where a tile is an intersection between one row and one column.
2. Determine a grouping of tiles into at least one tile group such that a set of tiles belong to a tile group.
3. For one tile group in the picture, decode one flag that specifies whether the tiles that belong to the tile group are dependent or independent. This operation/step 3 may alternatively be carried out before operation/step 2.
4. If the tiles in a tile group are dependent, decode the tile group wherein prediction between the tiles in the tile group is allowed such that there is at least one block in one tile in the tile group that predicts from at least one block in another tile in the tile group. Alternatively, decode the tile group where the subset S of the list from 1 to 11 in Embodiment A is allowed.
5. If the tiles in a tile group are independent, decode the tile group wherein prediction between the tiles in the tile group is not allowed such that there is no block in any tile in the tile group that predicts from any block in any different tile in the tile group. Alternatively, decode the tile group where the subset S of the list from 1 to 11 in Embodiment A is not allowed In an alternative embodiment, operation/step 3 is done by first decoding one or more syntax elements specifying the number (N) of tile groups there are in the picture, followed by a loop executed N times where one flag is decoded for each loop and the flag specifies whether the tiles in a particular tile group are dependent or independent. This syntax is preferably located in a parameter set.

Table 1 of FIG. 13 illustrates an exemplary syntax for example 1 of Embodiment A on top of JVET-M0853. Modifications over JVET-M0853 include lines 19-21.

Semantics for the new syntax element of FIG. 13 is shown below:

dependent_tiles_in_tile_group_flag[i] equal to 0 specifies that the tiles in i-th tile group are independent and dependent_tiles_in_tile_group_flag[i] equal to 1 specifies that the tiles in i-th tile group are dependent. When dependent_tiles_in_tile_group_flag[i] is not present it is inferred to be equal to 0.

Decoding process description is provided below.

The value of dependent_tile_in_tile_group_flag[i] may affect the decoding process of a current block in a picture by the following operations:

1. A variable dependent_tile_flag is derived for the tile group the current block belongs to by setting the value of dependent_tile_flag to the value of dependent_tile_in_tile_group_flag[j], where j is the tile index for the tile group the current block belongs to.
2. The neighboring block availability availableN for the current block with respect to a neighboring block is derived as follows:
   If one or more of the following conditions are true, availableN is set equal to FALSE:
   [a set of other conditions not described here]
   the neighboring block is contained in a different tile than the current block and the value of dependent_tile_flag for the tile containing the current block is equal to 0.
   Otherwise, availableN is set equal to TRUE.

Alternatively, the value of dependent_tile_in_tile_group_flag[i] may affect the decoding process of a current block in a picture by the following operations wherein the current block is the first block in a current tile and there is a previous tile that is the tile immediately preceding the current tile in decoding order, and the current tile and the previous tile belong to the same tile group:

1. A variable dependent_tile_flag is derived for the tile group the current tile and the previous tile belong to by setting the value of dependent_tile_flag to the value of dependent_tile_in_tile_group_flag[j], where j is the tile index for the tile group the current tile and the previous tile belong to.
2. At least one of a set of CABAC context variables, a set of rice parameter initialization states, and a set of dependent quantization states are stored when ending the parsing of the tile data of the previous tile.
3. If the value of dependent_tile_flag is equal to a value that specifies that the tiles in the tile group are dependent, at least one of the stored set of CABAC context variables, a stored set of rice parameter initialization states, and a stored set of dependent quantization states is used as input to a synchronization process for context variables, rice parameters and dependent quantization states before parsing the current tile, where the synchronization process sets at least one of a set of context variable values, one rice parameter initialization state and one dependent quantization state to a value stored in operation/step 2
4. Decode the current tile An Example 2 is discussed below.

In another example of this embodiment, similar to the previous example, a flag is signalled for each tile group that specifies whether the tiles in that tile group are dependent or independent. In this example however, there are separate flags for rectangular tile groups and separate flags for raster scan tile groups where the flags for rectangular tile groups are present in a parameter set and the flags for raster scan tile groups are signalled in the tile group header.

A decoder may perform all or a subset of the following operations for this embodiment to decode a picture:
1. Decode a tile partitioning structure from one or more syntax elements in the bitstream. The syntax is preferably located in a parameter set. The syntax may divide the picture into rows and columns where a tile is an intersection between one row and one column.
2. Decode one or more syntax elements specifying whether tile groups are rectangular or whether tile groups are in raster scan order.
3. If the tile groups are rectangular, first decode one or more syntax elements specifying the number (N) of rectangular tile groups there are in the picture, followed by a loop executed N times where one flag is decoded for each loop and the flag specifies whether the tiles in a particular rectangular tile group are dependent or independent. This syntax is preferably located in a parameter set.
4. If the tile groups are in raster scan order, decode one flag per raster scan tile group from the tile group header specifying whether the tiles in the raster scan tile group are dependent or independent.
5. If the tiles in a tile group are dependent, decode the tile group wherein prediction between the tiles in the tile group is allowed such that there is at least one block in one tile in the tile group that predicts from at least one block in another tile in the tile group. Alternatively, decode the tile group where the subset S of the list from 1 to 11 in Embodiment A is allowed
6. If the tiles in a tile group are independent, decode the tile group wherein prediction between the tiles in the tile group is not allowed such that there is no block in any tile in the tile group that predicts from any block in any different tile group in the tile group. Alternatively, decode the tile group where the subset S of the list from 1 to 11 in Embodiment A is not allowed Table 2 of FIG. 14 shows exemplary PPS syntax for Example 2 of Embodiment B on top of JVET-M0853. Modifications over JVET-M0853 in FIG. 14 include lines 31-32.

Table 3 of FIG. 15 illustrates an exemplary tile group header syntax for the second example of Embodiment B, on top of JVET-M0853. Modifications over JVET-M0853 in FIG. 15 include lines 7-8.

Semantics for the new syntax elements are shown below:
dependent_tiles_in_rect_tile_group_flag[i] equal to 0 specifies that the tile group consist of independent tiles. dependent_tiles_in_rect_tile_group_flag[i] equal to 1 specifies that the tile group consist of dependent tiles.

dependent_tiles_in_tile_group_flag equal to 0 specifies that the tile group consist of independent tiles. dependent_tiles_in_tile_group_flag equal to 1 specifies that the tile group consist of dependent tiles. When not present, the value of dependent_tiles_in_tile_group_flag is inferred to be equal to dependent_tiles_in_rect_tile_group_flag[tileGroupIdx]. [Ed note: tileGroupIdx is tile group index value for the current tile. When rectangular tiles are enables, then rect_tile_group_flag is equal to 0 and tileGroupIdx is set elsewhere to the tile group index of the current tile such that the correct value in the array dependent_tiles_in_rect_tile_group_flag is assigned to the variable dependent_tiles_in_tile_group_flag]

The decoding process described above may be applied for this example.

An Example 3 is discussed below.

In another example of this embodiment, a flag is signalled in a PPS for each tile that where the flag specifies whether a particular tile is dependent or independent from the previously decoded neighboring tiles.

A decoder may perform all or a subset of the following operations for this embodiment to decode a picture:
1. Decode a tile partitioning structure from one or more syntax elements in the bitstream. The syntax is preferably located in a parameter set. The syntax may divide the picture into rows and columns where a tile is an intersection between one row and one column.
2. Decode one or more syntax elements specifying the number (N) of tiles there are in the picture, followed by a loop executed N times where one flag is decoded for each loop and the flag specifies whether the tile is dependent or independent. This syntax is preferably located in a parameter set.
3. If the tile is dependent, decode the tile wherein prediction between the tiles is allowed such that there is at least one block in the tile that predicts from at least one block in another tile. Alternatively, decode the tile where the subset S of the list from 1 to 11 in Embodiment A is allowed.
4. If the tile is independent, decode the tile wherein prediction between the tile is not allowed such that there is no block in the tile that predicts from any block in any different tile. Alternatively, decode the tile where the subset S of the list from 1 to 11 in Embodiment A is not allowed.

Table 4 of FIG. 16 illustrates exemplary PPS syntax for Example 3 of Embodiment B on top of JVET-M0853. Modifications over JVET-M0853 include lines 9-10.

Semantics for the new syntax elements are shown below:
dependent_tile_flag[i] equal to 0 specifies that the i-th tile is independent. dependent_tile_flag[i] equal to 1 specifies that the i-th tile may be dependent on the tiles decoded prior to the i-th tile.

In another version of this example the flag specifies whether the i-th tile is dependent on tiles in the same tile group:
dependent_tile_flag[i] equal to 0 specifies that the i-th tile is independent. dependent_tile_flag[i] equal to 1 specifies that the i-th tile may be dependent on tiles in the same tile group as the i-th tile that are decoded prior to the i-th tile.

The decoding process described above may be applied for this example.

Embodiment C is discussed below with respect to flag per picture or per sequence (Section 5.3)

In this embodiment the dependencies between partitions is signalled using one or more syntax elements per picture and/or per sequence. Therefore, the dependencies between partitions are signalled for the whole picture or for the whole sequence in one go. In one example, there is a flag per picture that specifies the dependencies between tiles in every tile group in the picture. In the decoding process of this example, the picture is partitioned into tiles using tile rows and tile columns and tiles are grouped into tile groups and a dependency flag for the picture is parsed and decoded. If the dependency flag per picture is equal to one value (e.g. is equal to 0) it specifies that the tiles in all tile groups in the picture are independent and if the dependency flag is equal to another value (e.g. is equal to 1) it specifies that the tiles in all tile groups in the picture are dependent. That the tiles in all tile groups are dependent may mean that any neighboring two tiles in the picture are dependent or that any neighboring two tiles that belong to the same tile group are dependent. The dependency flag may be signalled separately for each picture, or the dependency flag may be signalled for a group of pictures, for example by placing the flag in a parameter set such as a picture parameter set.

Table 5 of FIG. 17 shows an exemplary syntax for Embodiment B on top of JVET-M0853. In this example one flag is signalled in the PPS specifying the dependency of the tiles within each tile group for all the tile groups in the picture. Modifications over JVET-M0853 in FIG. 17 include line 19.

Semantics for the new syntax elements are shown below.
dependent_tiles_in_tile_group_flag equal to 0 specifies that the tiles in a tile group are independent and dependent_tiles_in_tile_group_flag equal to 1 specifies that the tiles in a tile group are dependent. When dependent_tiles_in_tile_group_flag is not present it is inferred to be equal to 0.

The decoding process described above may be applied for this embodiment.

In a variant of this embodiment, templates for the dependency relations between the partitions may be defined and one or more syntax elements may specify which template to be used for the current picture or sequence. Templates may, for example but not limited to these examples, be signalled in a parameter set such as picture parameter set, or templates may be fixed templates which do not need to be signalled. For instance, template T1 specifies that all tiles in tile group A and all tiles in tile group C are independent and all tiles in tile group B are dependent, and template T2 specifies that all tiles in tile group B and all tiles in tile group C are independent and all tiles in tile group A are dependent. Then a syntax element specifies that for the current picture which of the tile dependency templates T1 or T2 should be used.

Embodiment D is discussed below with respect to Flags controlling different dependency aspects. (Section 5.4)

In this embodiment, the dependency between partitions is signalled using syntax elements that specify different dependency aspects such as availability for inter prediction, availability for intra prediction, resetting or keeping CABAC state moving from one partition to the other. A list of 11 dependency aspects is provided in the description of Embodiment A. Having different dependency aspects x and y between partitions A and B means that partition A can be dependent on partition B in aspect x and independent from partition B in aspect y.

A decoder may perform all or a subset of the following operations for this embodiment to decode a picture:
1. Decode a partitioning structure from one or more syntax elements in the bitstream. The syntax is preferably located in a parameter set. The partition syntax may divide the picture into rows and columns where a partition is an intersection between one row and one column such as the tile partitioning in HEVC.
2. Derive the dependencies between partitions in the picture by decoding one or more syntax elements from the bitstream. The picture may contain at least two partitions S1 and S2 that are specified by the syntax elements to be dependent and the picture may contain at least two partitions S3 and S4 that are specified to be independent wherein:
   a. There are at least two partitions S1 and S2
   b. S1 and S2 are spatial neighbors and there is a partition boundary between S1 and S2
   c. S1 is decoded before S2
   d. There is a block B1 in S1 and a block B2 in S2 that are spatial neighbors and share a boundary where the boundary is both a block boundary and a partition boundary
   e. A subset of the following is done:
      i. A flag F1 is decoded and if the value of F1 has one value, Intra sample prediction of B2 may be done by predicting samples values in B2 from sample values in B1. If the flag has another value, this is not allowed.
      ii. A flag F2 is decoded and if the value of F2 has one value, the intra mode for B2 may be predicted from the Intra mode of B1. If the flag has another value, this is not allowed.
      iii. A flag F3 is decoded and if the value of F3 has one value, the motion vector for B2 may be predicted from the motion vector of B1 and/or the reference picture used for B1. If the flag has another value, this is not allowed.
      iv. A flag F4 is decoded and if the value of F4 has one value, the reference picture to use for Inter prediction of B2 may be predicted from the reference picture used for B1. If the flag has another value, this is not allowed.
      v. A flag F5 is decoded and if the value of F5 has one value, the motion vector to use for B2 may be selected from a motion vector in B1, for example by a merge process. If the flag has another value, this is not allowed.
      vi. A flag F6 is decoded and if the value of F6 has one value, the quantization parameter value to use for B2 may be predicted or copied from a quantization parameter value of B1. If the flag has another value, this is not allowed.
      vii. A flag F7 is decoded and if the value of F7 has one value, the derivation of whether the inverse transform for B2 is skipped or not may depend on whether the inverse transform for B1 was skipped or not and/or other properties of B1. If the flag has another value, this is not allowed.
      viii. A flag F8 is decoded and if the value of F8 has one value, the derivation of whether there are any transform coefficients in B2 may depend on whether there are any transform coefficients in B1 or not and/or other properties of B1. If the flag has another value, this is not allowed.
      ix. A flag F9 is decoded and if the value of F9 has one value, the CABAC state for decoding of a syntax element for B2 may depend on properties of B1 such as but not limited to what mode B1 was coded as, what motion vector B1 uses, what reference picture B1 uses, what coefficient values there are in B1 and what state CABAC was in for B1. If the flag has another value, this is not allowed.
      x. A flag F10 is decoded and if the value of F10 has one value, the context to use for decoding of a syntax element for B2 may depend on properties of B1 such as but not limited to what mode B1 was coded as, what motion vector B1 uses, what reference picture B1 uses, what coefficient values there are in B1. If the flag has another value, this is not allowed.
      xi. A flag F11 is decoded and if the value F11 has one value, the filtering of samples in B2 may depend on samples in B1. If the flag has another value, this is not allowed. Filtering may for instance comprise in-loop deblocking filtering, sample adaptive offset (SAO) filtering, Adaptive loop filtering (ALF), bilateral filtering, or Hadamard filters.

3. Use the derived dependencies when decoding the picture.

Subset of the flags described above may alternatively be merged such that there is one flag F decoded and the value of a subset of flags F1 to F11 is set equal to the value of F.

Embodiment E is discussed below with respect to previous embodiments with directions. (Section 5.5)

In this embodiment, the directional aspect of the dependency is considered. This means that one or more code words are signalled for the dependency of partition A on partition B and the dependency of partition A on partition B is conditioned with the relative positioning of partitions A and B, for instance but not limited to this example that partition B is located on the left side of partition A.

In one example of this embodiment, one or more code words signal the dependency of partition A on partition B which is spatially located on a specific direction L with regards to A, for instance to the left of A, and another one or more code words signal the dependency of partition A on partition C which is spatially located on a specific direction T with regards to A, for instance above A.

A decoder may perform all or a subset of the following operations for this embodiment to decode a picture:
1. Decode a partitioning structure from one or more syntax elements in the bitstream. The syntax is preferably located in a parameter set. The syntax may divide the picture into rows and columns where a partition is an intersection between one row and one column.
2. Decode one or more syntax elements specifying the number (N) of tiles there are in the picture, followed by a loop executed N times and for each iteration of the loop a number (d) of flags are decoded where d is the number of directions and each of the d flags specifies whether the tile is dependent or independent to the tile in d-th direction relative to the current partition. This syntax is preferably located in a parameter set. In one example d may be equal to 2, and so two flags are signalled for each partition, one flag may refer to the dependency of the current partition on the left partition (first direction is specified as left direction) and the other flag may refer to the dependency of the current partition on the above partition (second direction is specified as the above direction).
3. If the tile is dependent, decode the tile wherein prediction between the tiles is allowed such that there is at least one block in the tile that predicts from at least one block in another tile. Alternatively, decode the tile where the subset S of the list from 1 to 11 in Embodiment A is allowed.
4. If the tile is independent, decode the tile wherein prediction between the tile is not allowed such that there is no block in the tile that predicts from any block in any different tile. Alternatively, decode the tile where the subset S of the list from 1 to 11 in Embodiment A is not allowed.

In one example of this embodiment two code words are signalled per tile and the first code word specifies the dependency of tile A on tile B which is spatially located to the left of tile A and only if tile A is not located on the left border of the picture, and the second code word specifies the dependency of tile A on tile C which is spatially located above A and only if tile A is not located on the top border of the picture.

Table 6 of FIG. 18 shows exemplary PPS syntax for the example of Embodiment F on top of JVET-M0853. Modifications over JVET-M0853 in FIG. 18 include lines 9-12.

dependent_on_left_tile_flag[i] equal to 0 specifies that the i-th tile is independent. dependent_on_left_tile_flag[i] equal to 1 specifies that the i-th tile may be dependent on the tiles spatially located on the left of the i-th tile if the i-th tile is not on the left border of the picture. When dependent_on_left_tile_flag[i] is not present the value of dependent_on_left_tile_flag[i] is inferred to be equal to 0.

dependent_on_above_tile_flag[i] equal to 0 specifies that the i-th tile is independent. dependent_on_above_tile_flag[i] equal to 1 specifies that the i-th tile may be dependent on the tiles spatially located above the i-th tile if the i-th tile is not located on the top border of the picture. When dependent_on_above_tile_flag[i] is not present the value of dependent_on_above_tile_flag[i] is inferred to be equal to 0.

In a variant of this embodiment, the directional dependencies are extended to non-spatially-neighboring partitions. In one example, the directional dependencies are extended to content-wise neighboring partitions which are partitions that are not spatially neighboring but share continuous content. One example for this variant of Embodiment F is the frame packing of cubemap projection (illustrated in FIG. 7) where for example the content in left face continues to the right face but the left face and right face are packed in the left and right side of the picture frame with the front face in between and so have no spatial neighborhood. In this example, directional dependencies may be defined that cover the face continuity despite the spatial distance of the faces in the packed frame.

Figure 7:
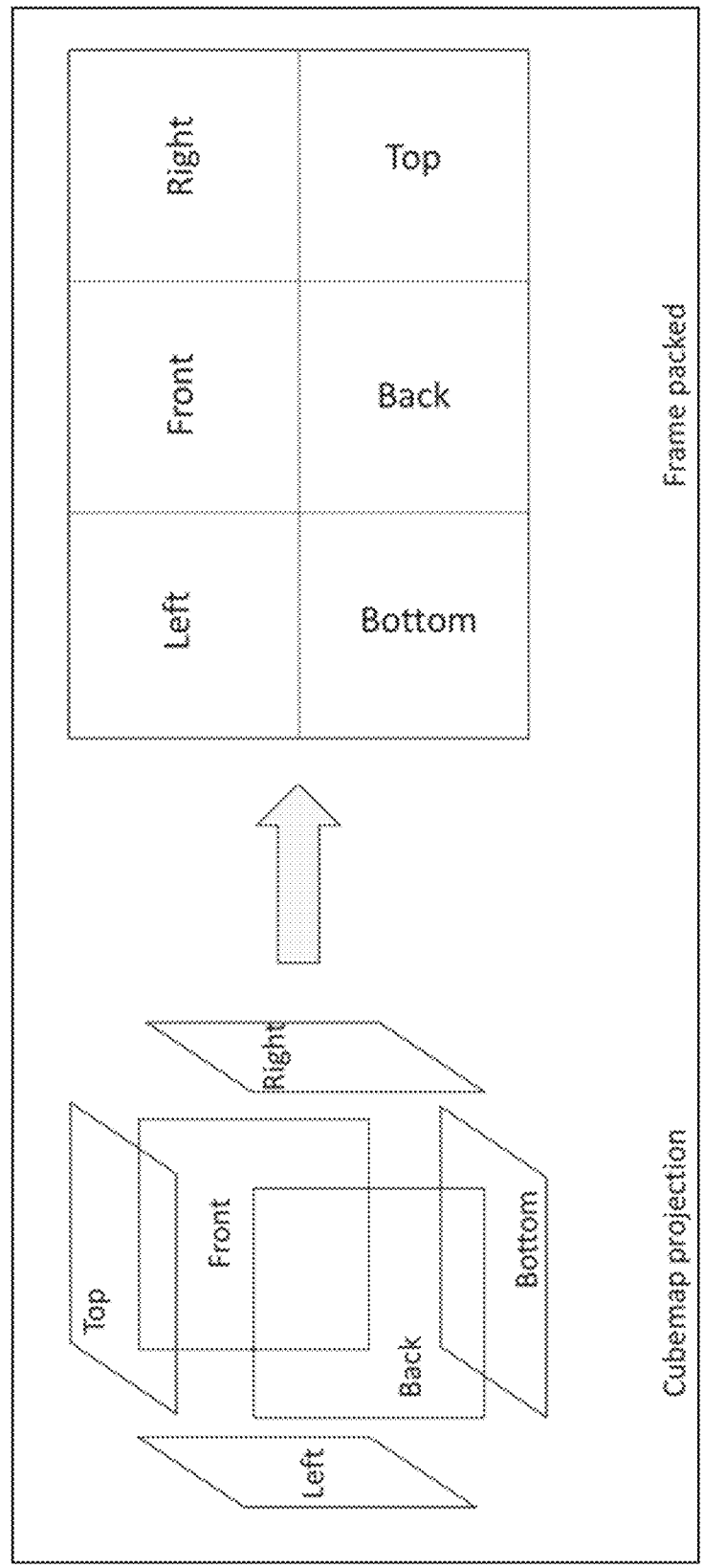
FIG. 7 illustrates a cubemap projection and a corresponding packed frame according to some embodiments of inventive concepts.

FIG. 7 illustrates a cubemap projection and the corresponding packed frame which packs continuous parts of the content in partitions that can be not spatially neighboring each other and with possible rotations. This embodiment can be combined with other embodiments e.g. with Embodiment D to have different dependency aspects between partitions.

Embodiment F is discussed below with respect to full merge to one tile. (Section 5.6)

In this embodiment, the dependency between two partitions is handled as a full merge of the two partitions. Full merge may be defined as that the resulting region is treated as one partition in every aspect, e.g. with full prediction availability and dependent CABAC state derivations.

In one example, if tiles A and B are fully merged, the resulting region C is treated as one single tile C. FIGS. 8A, 8B, 8C, and 8D illustrate an example of this embodiment with the full merge of tiles within tile groups to realize the desired partitioning illustrated in FIG. 5. To realize the desired partitioning structure, first the picture is partitioned into a tile grid (FIG. 8A), then tiles are grouped into tile groups (FIG. 8B) then the dependent tiles are specified (FIG. 8C) followed by a full merge of the dependent tiles (FIG. 8D) within each tile group resulting in the desired partitioning structure. In other embodiments, the picture is partitioned as shown in FIG. 8C), which consists of 36 tiles and 24 tile groups. In this embodiment the picture is partitioned as shown in FIG. 8D), which consists of 24 tiles and 24 tile groups.

FIGS. 8A, 8B, 8C, and 8D illustrate a realization of a desired partitioning structure of FIG. 5 using Embodiment F.

In one example, the decoder derives a dependency flag value for each tile group as described earlier in this disclosure, where a dependency flag value specifies whether the tiles in a particular tile group are dependent or independent to each other. If the dependency flag specifies that the tiles are dependent, the tile group is treated as one single tile during decoding. For example, if the flag specifies that the tiles in a tile group are dependent, a set of decoding operations/steps may only be executed once for the tile group even though there are more than one tile in the tile group. If the flag specifies that the tiles are dependent, the set of decoding operations/steps are executed once per tile in the tile group when there is more than one tile in the tile group.

A decoder may perform all or a subset of the following operations/for this embodiment to decode a picture:
1. Decode a tile partitioning structure from one or more syntax elements in the bitstream. The syntax is preferably located in a parameter set. The syntax may divide the picture into rows and columns where a tile is an intersection between one row and one column.
2. Determine a grouping of tiles into at least one current tile group such that there is a set of tiles belong to a current tile group where there are at least two tiles in the set in the current tile group.
3. For the current tile group in the picture, decode one flag that specifies whether the at least two tiles that belong to the current tile group are dependent or independent. This operation/step 3 may alternatively be carried out before operation/step 2.
4. If the at least two tiles in the current tile group are independent according to the flag, execute a set S of decoding operations/steps for each of the at least two tiles in the current tile group when decoding the current tile group.
5. If the at least two tiles in the current tile group are dependent according to the flag, the set S of decoding operations/steps may be executed only once for the current tile group (the entire current tile group is here handled as a single tile)

The set S of decoding operations may include one or more of the following:
1. Derive the spatial location of the tile and the spatial location of the first block in the tile
2. Reset and initialize an arithmetic decoder engine such as a CABAC engine. This may include resetting context variable values used by the arithmetic engine and/or rice parameter initialization states
3. After the tile, flush CABAC and byte align the output bitstream, for example by outputting a bit value equal to 1 followed by 0 to 7 bit values equal to 0 such that the bitstream is byte aligned.
4. After decoding all block data in the tile, decode one flag that specifies whether there is another tile following the tile in the current tile group of whether there are no more tiles following the tile in the current tile group
5. Derive a bitstream pointer from syntax parsed from a tile group header where the syntax may specify an entry point offset in bytes
6. Set a predicted QP value for the tile to a QP prediction value derived for the tile group such the QP prediction value is set as the predicted QP values for all tiles in the tile group.

Alternatively, a decoder may perform all or a subset of the following operations for this embodiment to decode a picture:
1. Decode a tile partitioning structure from one or more syntax elements in the bitstream. The syntax is preferably located in a parameter set. The syntax may divide the picture into rows and columns where a tile is an intersection between one row and one column.
2. Determine a grouping of tiles into at least one current tile group such that there is a set of tiles belong to a current tile group where there are at least two tiles in the set in the current tile group.
3. For the current tile group in the picture, decode one flag that specifies whether the at least two tiles that belong to the current tile group are dependent or independent. This operation/step 3 may alternatively be carried out before operation/step 2.
4. If the at least two tiles in the current tile group are independent according to the flag, decode the current tile group while treating the boundaries between any two tiles A and B that both belong to the current tile group as tile boundaries.
5. If the at least two tiles in the current tile group are dependent according to the flag, decode the current tile group while treating the boundaries between any two tiles A and B that both belong to the current tile group as block boundaries and not as tile boundaries, where the block boundaries may be treated as CTU boundaries.

Embodiment G is discussed below with respect to previous embodiments with flags per tile indicating which neighbor it merges with. (Section 5.7)

In this embodiment, (similar to Embodiment E) separate syntax elements indicate the dependency of partitions on neighboring partitions. The difference of this embodiment and Embodiment E is that in Embodiment E a syntax element specifies the dependency of partition A on partition B where B is positioned at a certain direction relative to A but in this embodiment a syntax element specifies the dependency of partition A on all partitions that are positioned at a certain direction relative to A. In one example, if A is not a rectangular partition, A may have more than one neighbor spatially positioned above A where the dependency of A on all the neighbors spatially located on top of A are signalled using the same syntax element.

Figure 9B:
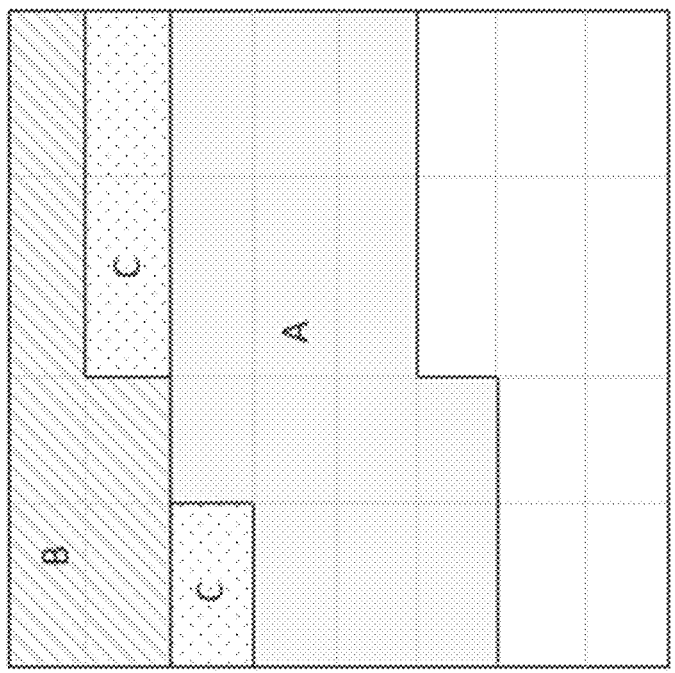
FIGS. 9A and 9B illustrate tile groups A, B, and C provided as rectangular tile groups and as raster scan tile groups according to some embodiments of inventive concepts.
Figure 9A:
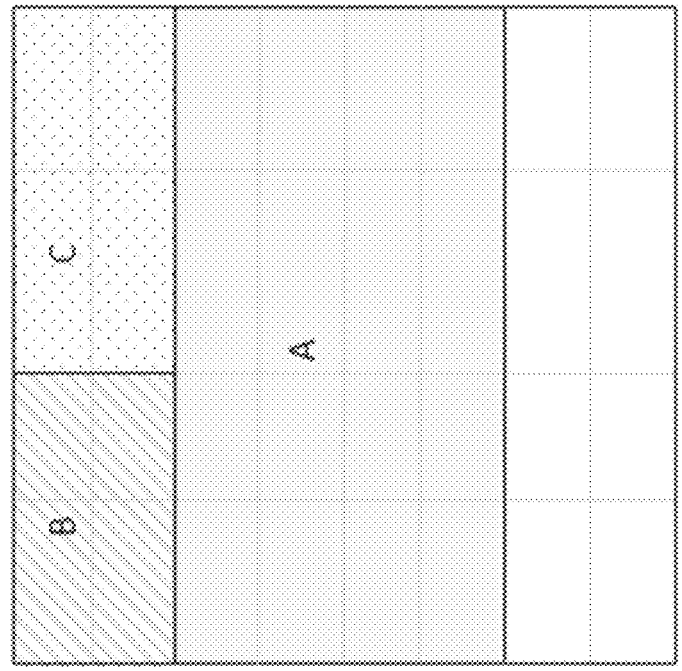

FIGS. 9A and 9B illustrate the case where tile group A has two tile groups B and C as the neighbors above tile group A. As an example of this embodiment, one syntax element is used to specify the dependency of A on B and C jointly as both B and C are neighbors to A and are located above A.

In FIGS. 9A and 9B, tile group A has two tile groups B and C as the neighbors above tile group A. The dependency of A on B and C is signalled using one syntax element since both B and C are neighbors to A and are located above A. Gray lines are tile borders and black lines are tile group borders. FIG. 9A illustrates Rectangular tiles groups, and FIG. 9B illustrates Raster scan tile groups A decoder may perform all or a subset of the following operations for this embodiment to decode a picture:
1. Decode a tile partitioning structure from one or more syntax elements in the bitstream. The syntax is preferably located in a parameter set. The syntax may divide the picture into rows and columns where a tile is an intersection between one row and one column.
2. Determine a grouping of tiles into at least one tile group such that a set of tiles belong to a tile group.
3. For one tile group in the picture, decode one flag that specifies whether the tiles that belong to the tile group are dependent or independent.
4. For one tile group in the picture, decode one or more flags that specify whether this tile group is dependent or independent from the neighboring tile group(s) positioned to at least one of top, left, right, bottom direction relative to the tile group. Each flag may specify one direction.
5. If the tiles in a tile group are independent and the tile group is independent from other tile groups, decode the tile group wherein prediction between the tiles in the tile group and predictions between the tile group and other tile groups are not allowed such that there is no block in any tile in the tile group that predicts from any block in any different tile in the picture. Alternatively, decode the tile group where the subset S of the list from 1 to 11 in Embodiment A is not allowed 6. If the tiles in a tile group are dependent and the tile group is dependent on other tile groups, decode the tile group wherein prediction between the tiles in the tile group and prediction between the tiles in the tile group and the tiles in other tile groups that the tile group is dependent on them is allowed such that there is at least one block in one tile in the tile group or in other tile groups that the tile group is dependent on them that predicts from at least one block in another tile in the tile group or in other tile groups that the tile group is dependent on them. Alternatively, decode the tile group where the subset S of the list from 1 to 11 in Embodiment A is allowed.

Table 7 of FIG. 19 shows an exemplary syntax for an example of Embodiment G on top of JVET-M0853. Modifications over JVET-M0853 in FIG. 19 include lines 19-23.

Semantics for new syntax elements are shown below:

dependent_tiles_in_tile_group_flag[i] equal to 0 specifies that the tiles in i-th tile group are independent and dependent_tiles_in_tile_group_flag[i] equal to 1 specifies that the tiles in i-th tile group are dependent. When dependent_tiles_in_tile_group_flag[i] is not present it is inferred to be equal to 0.

dependent_to_above_tile_groups_flag[i] equal to 0 specifies that the i-th tile group is independent from other tile groups spatially located above the i-th tile group and dependent_to_above_tile_groups_flag[i] equal to 1 specifies that the i-th tile group is dependent on all j-th tile groups where j-th tile group is a neighbor to the i-th tile group and j-th tile group is positioned above the i-th tile group and j<i. When dependent_to_above_tile_groups_flag[i] is not present it is inferred to be equal to 0.

dependent_to_left_tile_groups_flag[i] equal to 0 specifies that the i-th tile group is independent from other tile groups spatially located to the left of the i-th tile group and dependent_to_left_tile_groups_flag[i] equal to 1 specifies that the i-th tile group is dependent on all j-th tile groups where j-th tile group is a neighbor to the i-th tile group and j-th tile group is positioned to the left of the i-th tile group and j<i. When dependent_to_left_tile_groups_flag[i] is not present it is inferred to be equal to 0.

Embodiment H is discussed below with respect to a flag for the external tile group borders, flag per-border or flag per tile group.

In this embodiment, separate syntax elements indicate the dependency inside the partition and the dependency outside the partition. In an example, a partition is a tile group and the value of a flag specifies the dependency between the tiles inside the tile group and another syntax element specifies the dependency between the tile group and a neighboring tile group. The dependency between tile groups A and B may be conditioned to the case that the tiles inside tile group A are dependent and the tiles inside tile group B are dependent.

This embodiment can be combined with any of the other embodiments e.g. to have different dependency aspects between partitions (Embodiment D) or to add direction to the dependency between partitions (Embodiment E) or having dependencies to the left and/or the top neighbors (Embodiment G).

In one example of this embodiment, a flag is signalled for each tile group and the flag indicates if the tiles in that tile group are independent from each other or they may have dependencies. Then another flag per tile group is signalled where for tile group N in tile groups scan order, the flag specifies if the tile group N is independent from other tile groups or tile group N may be dependent on any neighboring tile group or groups which are among the N−1 previously signalled tile groups. The dependency between tiles in a tile group or the dependency between two tile groups may be defined as a subset of the list provided above with respect to details on dependent and independent partitions or may be defined as a full merge described in Embodiment F.

A decoder may perform all or a subset of the following operations for this embodiment to decode a picture:

1. Decode a tile partitioning structure from one or more syntax elements in the bitstream. The syntax is preferably located in a parameter set. The syntax may divide the picture into rows and columns where a tile is an intersection between one row and one column.
2. Determine a grouping of tiles into at least one tile group such that a set of tiles belong to a tile group.
3. For one tile group in the picture, decode one flag that specifies whether the tiles that belong to the tile group are dependent or independent.
4. For one tile group in the picture, decode one flag that specifies whether this tile group is dependent or independent from the previous tile groups.
5. If the tiles in a tile group are independent and the tile group is independent from other tile groups, decode the tile group wherein prediction between the tiles in the tile group and predictions between the tile group and other tile groups are not allowed such that there is no block in any tile in the tile group that predicts from any block in any different tile in the picture. Alternatively, decode the tile group where the subset S of the list from 1 to 11 in Embodiment A is not allowed
6. If the tiles in a tile group are dependent and the tile group is dependent on other tile groups, decode the tile group wherein prediction between the tiles in the tile group and prediction between the tiles in the tile group and the tiles in other tile groups that the tile group is dependent on them is allowed such that there is at least one block in one tile in the tile group or in other tile groups that the tile group is dependent on them that predicts from at least one block in another tile in the tile group or in other tile groups that the tile group is dependent on them. Alternatively, decode the tile group where the subset S of the list from 1 to 11 in Embodiment A is allowed.

Table 8 of FIG. 20 shows an exemplary syntax for an example of Embodiment A on top of JVET-M0853. Modifications over JVET-M0853 in FIG. 20 include lines 19-21 and 28.

Semantics for new syntax elements are shown below:

dependent_tiles_in_tile_group_flag[i] equal to 0 specifies that the tiles in i-th tile group are independent and dependent_tiles_in_tile_group_flag[i] equal to 1 specifies that the tiles in i-th tile group are dependent. When dependent_tiles_in_tile_group_flag[i] is not present it is inferred to be equal to 0.

dependent_tile_group_flag[i] equal to 0 specifies that the i-th tile group is independent and dependent_tile_group_flag[i] equal to 1 specifies that the i-th tile group is dependent on all j-th tile groups where j-th tile group is a neighbor to the i-th tile group and j<i. When dependent_tile_group_flag[i] is not present it is inferred to be equal to 0.

Figure 10B:
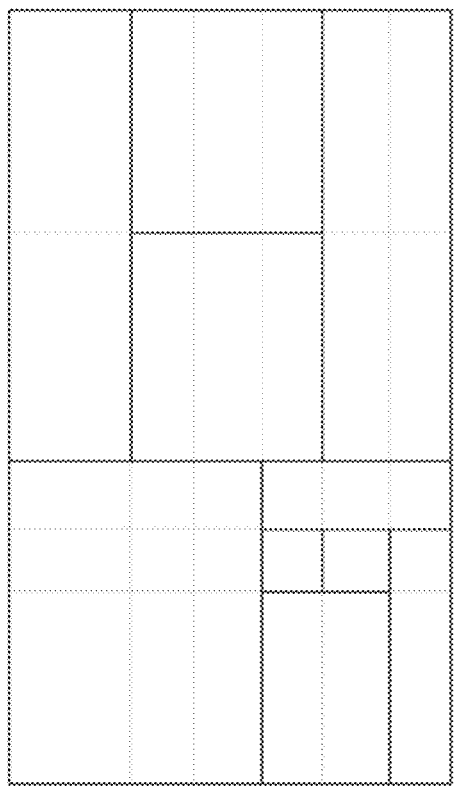
FIGS. 10A and 10B illustrate tile groups according to some embodiments of inventive concepts.
Figure 10A:
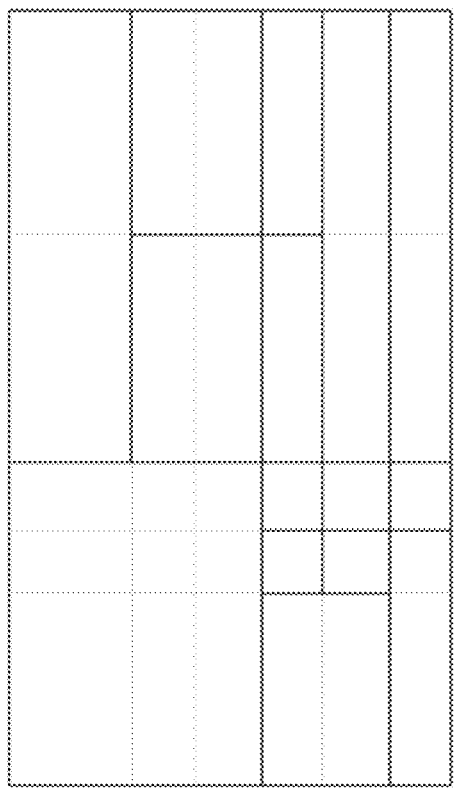

FIGS. 10A and 10B illustrate a tile group partition example where some of the tile groups are merged together to create a new partition structure using Embodiment H.

In FIGS. 10A and 10B, some tile groups in the tile group partition in FIG. 10A are merged together and the merge result is shown in FIG. 10B. Gray lines are tile borders and black lines are tile group borders.

Figure 11:
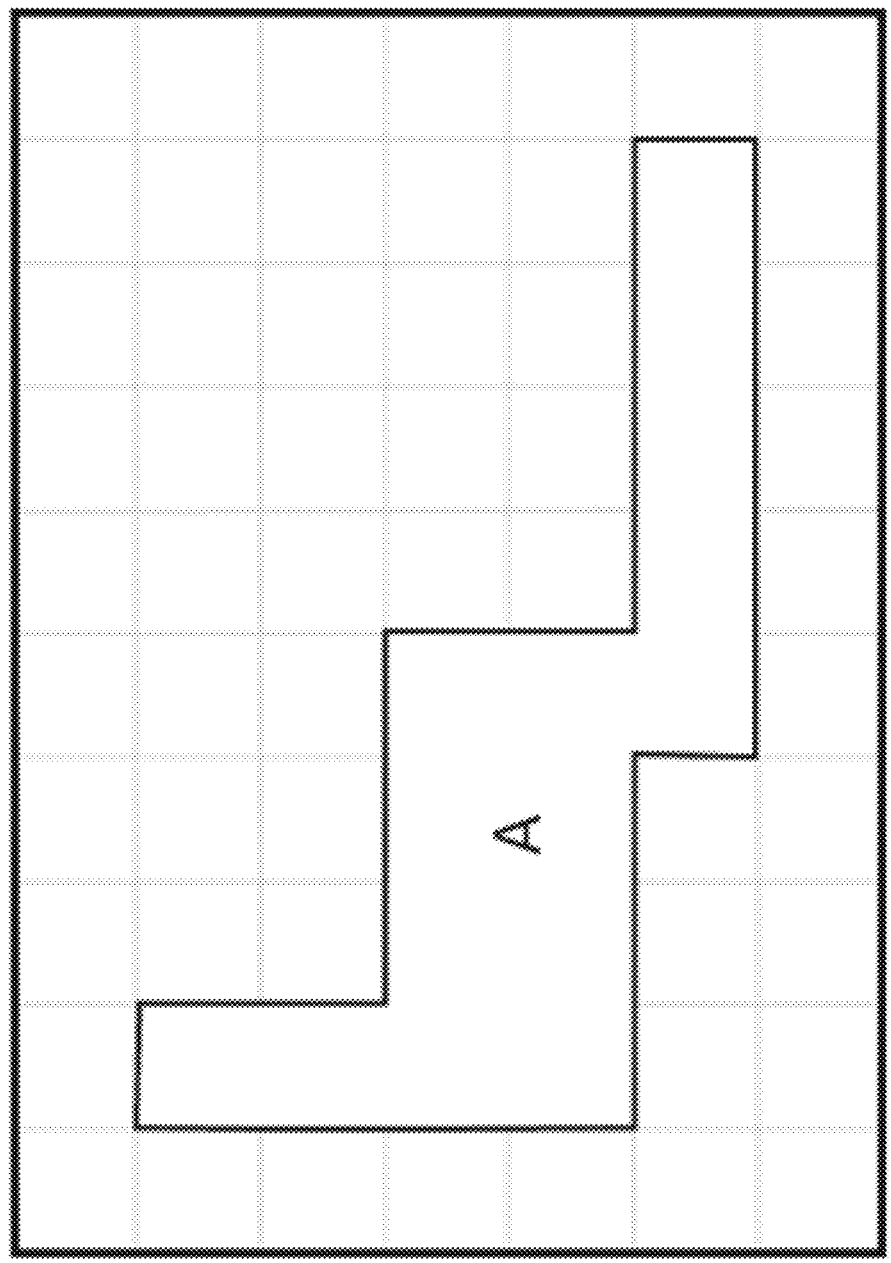
FIG. 11 illustrates an arbitrary petition enabled using Embodiment 8 according to some embodiments of inventive concepts.

In another example, a flag is signalled per border of partitions and the flag specifies a full merge between the two partitions that share the border. FIG. 11 illustrates an example where arbitrary partitions can be created using this example of Embodiment H. FIG. 11 illustrates an example of arbitrary partition structures such as partition A which is enabled using Embodiment H.

Operations of an electronic device performing decoding operations according to some embodiments of inventive concepts are discussed below with respect to FIG. 25. By way of example, such operations may be performed by a wireless device, and operations of such a wireless device 300 (implemented using the structure of the block diagram of FIG. 21) will now be discussed with reference to the flow chart of FIG. 25 according to some embodiments of inventive concepts. For example, modules may be stored in memory 305 of FIG. 21, and these modules may provide instructions so that when the instructions of a module are executed by respective wireless device processing circuitry 303, processing circuitry 303 performs respective operations of the flow chart. For example, the electronic device may be a smartphone, a table computer, a laptop computer, a television, etc.

At block 2501, processing circuitry 303 may receive a bitstream including a picture over a radio and/or network interface from a remote device (e.g., from a remote media server). The bitstream, for example, may be received through transceiver circuitry 301 over a radio interface and/or other network interface. The bitstream, for example, may be a video bitstream including a plurality of pictures. Moreover, the bitstream may be received from a media server over a wired/wireless communication network.

At block 2503, processing circuitry 303 may decode a partitioning syntax element from the bitstream. At block 2505, processing circuitry 303 may determine a partitioning structure of the picture, wherein the partitioning structure defines at least first and second partitions of the picture. For example, the partitioning structure may be determined based on the partitioning syntax element.

At block 2507, processing circuitry 303 may decode at least one dependency syntax element from the bitstream. At block 2509, processing circuitry 303 may determine whether the second partition is dependent on or independent of the first partition based on the at least one dependency syntax element. At block 2511, processing circuitry may decode the picture from the bitstream based on determining whether the second partition of the picture is dependent on or independent of the first partition of the picture.

At block 2515, processing circuitry 303 may render the picture for display on a screen based on decoding the picture from the bitstream. If the electronic device is a smartphone, for example, the picture may be rendered for display on a touch sensitive screen of the smartphone as part of a video played by the smartphone.

Figure 25:
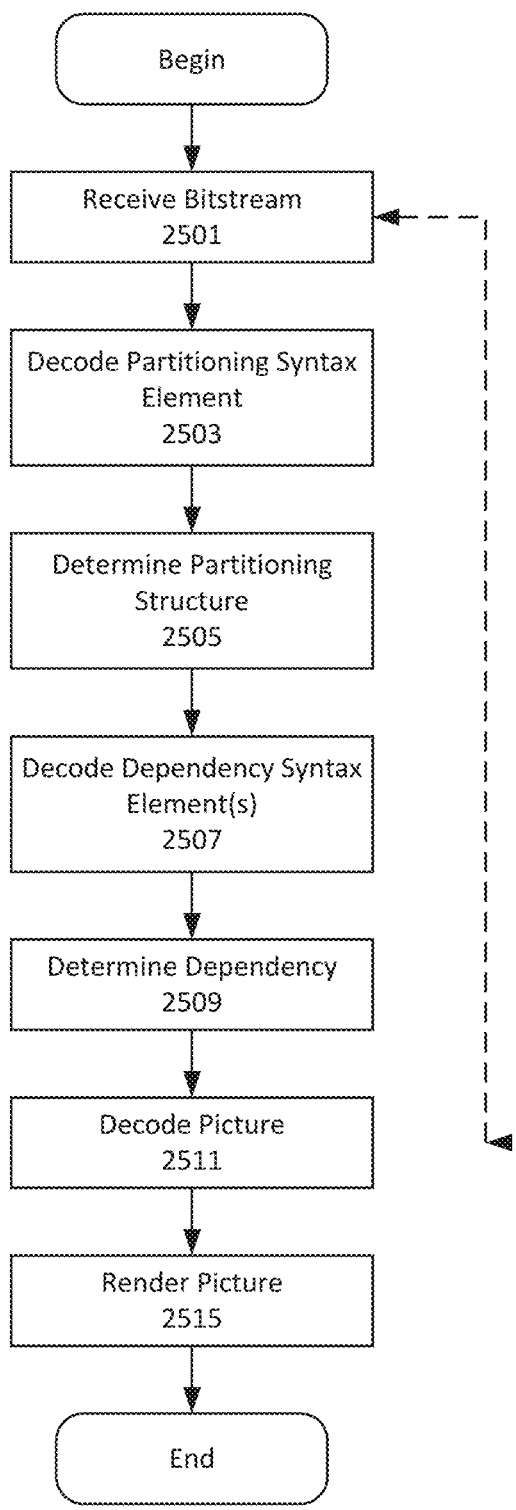
FIG. 25 is a flow chart illustrating decoding operations according to some embodiments of inventive concepts.

Various operations from the flow chart of FIG. 25 may be optional with respect to some embodiments of electronic devices and related methods. Regarding methods of example embodiment 1 (set forth below), for example, operations of blocks 2501, 2503, and 2515 of FIG. 25 may be optional.

Operations of an electronic device performing encoding operations according to some embodiments of inventive concepts are discussed below with respect to FIG. 26. By way of example, such operations may be performed by a media server, and operations of such a media server 600 (implemented using the structure of the block diagram of FIG. 24) will now be discussed with reference to the flow chart of FIG. 26 according to some embodiments of inventive concepts. For example, modules may be stored in memory 605 of FIG. 24, and these modules may provide instructions so that when the instructions of a module are executed by respective media server processing circuitry 603, processing circuitry 603 performs respective operations of the flow chart. For example, the electronic device may be a media server used to distribute picture/video contend. According to some other embodiments, the electronic device of FIG. 26 may be a smartphone, a table computer, a laptop computer, a television, or any other device that encodes/transmits picture/video content.

At block 2601, processing circuitry 603 may define a partitioning structure of a picture of a bitstream, wherein the partitioning structure includes at least first and second partitions of the picture.

At block 2603, processing circuitry 603 may encode a partitioning syntax element for the bitstream, wherein the partitioning syntax element defines the partitioning structure of the picture based on determining the partitioning structure. At block 2605, processing circuitry 603 may determine whether the second partition is dependent on or independent of the first partition.

At block 2607, processing circuitry 603 may encode at least one dependency syntax element for the bitstream, wherein the at least one dependency syntax element specifies whether the second partition is dependent on or independent of the first partition.

At block 2609, processing circuitry 603 may encode the first and second partitions into the bitstream based on determining the partitioning structure and based on determining whether the second partition of the picture is dependent on or independent of the first partition of the picture.

At block 2611, processing circuitry 603 may transmit the bitstream over a network and/or radio interface to a remote device (e.g., to a wireless device UE, a smartphone, a tablet computer, a laptop computer, etc.). The bitstream may thus be received by the remote device as discussed above with respect to block 2501 of FIG. 25.

Figure 26:
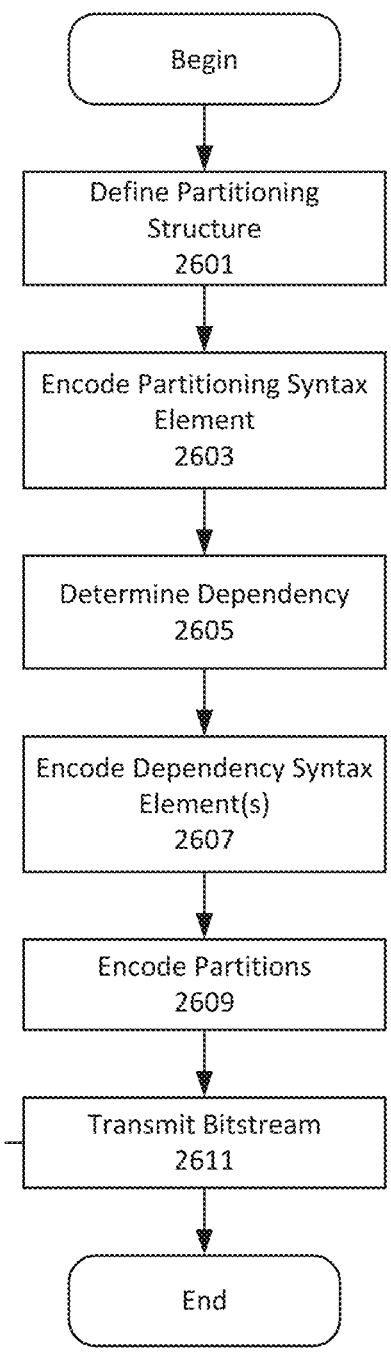
FIG. 26 is a flow chart illustrating encoding operations according to some embodiments of inventive concepts.

Various operations from the flow chart of FIG. 26 may be optional with respect to some embodiments of electronic devices and related methods. Regarding methods of example embodiment 30 (set forth below), for example, operations of blocks 2603, and 2611 of FIG. 26 may be optional.

A proposed availability process according to some embodiments of inventive concepts is discussed below.

Some embodiments of inventive concepts propose adding, a condition that the value of dependent_tiles_in_tile_group_flag is equal to 0 for the availability to be false when the current and neighboring luma sample locations belong to different tiles in the same tile group. Using HEVC v5 specification text as an illustration, a proposed embodiment would include the following line of text:

6.4.1 Derivation Process for z-Scan Order Block Availability

According to some embodiments of inventive concepts, inputs to this process include:
 The luma location (xCurr, yCurr) of the top-left sample of the current block relative to the top-left luma sample of the current picture
 The luma location (xNbY, yNbY) covered by a neighboring block relative to the top-left luma sample of the current picture.

According to some embodiments of inventive concepts, an output of this process is the availability of the neighboring block covering the location (xNbY, yNbY), denoted as availableN.

According to some embodiments of inventive concepts, the minimum luma block address in z-scan order minBlockAddrCurr of the current block is derived as follows:

minBlockAddrCurr=MinTbAddrZs
[xCurr>>MinTbLog2SizeY]
[yCurr>>MinTbLog2SizeY](6-1)

According to some embodiments of inventive concepts, the minimum luma block address in z-scan order minBlockAddrN of the neighboring block covering the location (xNbY, yNbY) is derived as follows:

If one or more of the following conditions are true, minBlockAddrN is set equal to −1:
xNbY is less than 0
yNbY is less than 0
xNbY is greater than or equal to pic_width_in_luma_samples
yNbY is greater than or equal to pic_height_in_luma_samples
Otherwise (xNbY and yNbY are inside the picture boundaries), minBlockAddrN=MinTbAddrZs
[xNbY>>MinTbLog2SizeY]
[yNbY>>MinTbLog2SizeY](62)

According to some embodiments of inventive concepts, the neighboring block availability availableN is derived as follows:

If one or more of the following conditions are true, availableN is set equal to FALSE:
minBlockAddrN is less than 0,
minBlockAddrN is greater than minBlockAddrCurr,
the variable SliceAddrRs associated with the slice segment containing the neighboring block with the minimum luma block address minBlockAddrN differs in value from the variable SliceAddrRs associated with the slice segment containing the current block with the minimum luma block address minBlockAddrCurr.
the neighboring block with the minimum luma block address minBlockAddrN is contained in a different tile than the current block with the minimum luma block address minBlockAddrCurr and the value of dependent_tiles_in_tilegroup_flag for the tile containing the current block is equal to 0.
Otherwise, availableN is set equal to TRUE.

6.4.2 Derivation Process for Prediction Block Availability

According to some embodiments of inventive concepts, inputs to this process include:
the luma location (xCb, yCb) of the top-left sample of the current luma coding block relative to the top-left luma sample of the current picture,
a variable nCbS specifying the size of the current luma coding block,
the luma location (xPb, yPb) of the top-left sample of the current luma prediction block relative to the top-left luma sample of the current picture,
two variables nPbW and nPbH specifying the width and the height of the current luma prediction block,
a variable partIdx specifying the partition index of the current prediction unit within the current coding unit,
the luma location (xNbY, yNbY) covered by a neighboring prediction block relative to the top-left luma sample of the current picture.

According to some embodiments of inventive concepts, output of this process is the availability of the neighboring prediction block covering the location (xNbY, yNbY), denoted as availableN is derived as follows.

According to some embodiments of inventive concepts, the variable sameCb identifies whether the current luma prediction block and the neighboring luma prediction block cover the same luma coding block, and is derived as follows:

If all of the following conditions are true, sameCb is set equal to TRUE:
xCb is less than or equal than xNbY,
yCb is less than or equal than yNbY,
(xCb+nCbS) is greater than xNbY,
(yCb+nCbS) is greater than yNbY.
Otherwise, sameCb is set equal to FALSE.

According to some embodiments of inventive concepts, the neighboring prediction block availability availableN is derived as follows:

If sameCb is equal to FALSE, the derivation process for z-scan order block availability as specified in clause 6.4.1 is invoked with (xCurr, yCurr) set equal to xPb, yPb) and the luma location (xNbY, yNbY) as inputs, and the output is assigned to availableN.
Otherwise, if all of the following conditions are true, availableN is set equal to FALSE:
(nPbW<<1) is equal to nCbS,
(nPbH<<1) is equal to nCbS,
partIdx is equal to 1,
(yCb+nPbH) is less than or equal to yNbY,
(xCb+nPbW) is greater than xNbY.
Otherwise, availableN is set equal to TRUE.

When availableN is equal to TRUE and CuPredMode [xNbY] [yNbY] is equal to MODE_INTRA, availableN is set equal to FALSE.

Proposed CABAC behavior according to some embodiments of inventive concepts is discussed below.

Some embodiments of inventive concepts propose that context variables, rice parameter initialization states and dependent quantization states are stored when ending the parsing of tile data when dependent_tiles_in_tile_group_flag is equal to 1. Some embodiments of inventive concepts also propose that this stored data is used as input to a synchronization process for context variables, rice parameters and dependent quantization states before parsing a tile that is not the first tile in a tile group and dependent_tiles_in_tile_group_flag is equal to 1.

Section "9.5 CABAC parsing process for tile group data" previously contained empty sections "9.5.1 General" and "9.5.2 Initialization". It was therefore not possible to implement this proposal on top of the VVC specification. However, dependent tiles are similar to dependent slices in HEVC v5 that contains the following text. According to some embodiments of inventive concepts, similar mechanisms are included in VVC to handle dependent tiles when the equivalent CABAC text is included in the VVC draft.

When ending the parsing of the general slice segment data syntax in clause 7.3.8.1, dependent_slice_segments_enabled_flag is equal to 1 and end_of_slice_segment_flag is equal to 1, the storage process for context variables, Rice parameter initialization states, and palette predictor variables as specified in clause 9.3.2.4 is invoked with TableStateIdxDs, TableMpsValDs, TableStatCoeffDs when persistent_rice_adaptation_enabled_flag is equal to 1, and PredictorPaletteSizeDs and PredictorPaletteEntriesDs when palette_mode_enabled_flag is equal to 1 as outputs.

Otherwise, if CtbAddrInRs is equal to slice_segment_address and dependent_slice_segment_flag is equal to 1, the synchronization process for context variables and Rice parameter initialization states as specified in clause 9.3.2.5 is invoked with TableStateIdxDs, TableMpsValDs, TableStatCoeffDs, PredictorPaletteSizeDs, and TablePredictorPaletteEntriesDs as inputs.

Example embodiments are discussed below.

1. A method of decoding a picture from a bitstream, the method comprising: determining (2505) a partitioning structure of the picture, wherein the partitioning structure defines at least first and second partitions of the picture; decoding (2507) at least one dependency syntax element from the bitstream; determining (2509) whether the second partition is dependent on or independent of the first partition based on the at least one dependency syntax element; and decoding (2511) the picture from the bitstream based on determining whether the second partition of the picture is dependent on or independent of the first partition of the picture.

2. The method of Embodiment 1, wherein the first partition comprises at least one first tile, wherein the second partition comprises at least one second tile, and wherein determining whether the second partition is dependent on or independent of the first partition comprises determining whether the second partition is dependent on or independent of the first partition across a tile boundary between the at least one first tile and the at least one second tile.

3. The method of any of Embodiments 1-2, wherein determining whether the second partition is dependent on or independent of the first partition comprises determining that the second partition is independent of the first partition, and wherein decoding the picture comprises decoding the second partition independent of decoding the first partition.

4. The method of Embodiment 3, wherein decoding the picture comprises treating a boundary between the first and second partitions as a tile boundary.

5. The method of any of Embodiments 1-2, wherein determining whether the second partition is dependent on or independent of the first partition comprises determining that the second partition is dependent on the first partition, and wherein decoding the picture comprises decoding the second partition using at least one decoded property from the first partition.

6. The method of Embodiment 5, wherein decoding the picture comprises treating a boundary between the first and second partitions as a block boundary.

7. The method of any of Embodiments 5-6, wherein the first partition comprises a first plurality of blocks, wherein the second partition comprises a second plurality of blocks, wherein decoding the picture comprises decoding one of the second plurality of blocks using at least one decoded property from one of the first plurality of blocks.

8. The method of Embodiment 7, wherein decoding comprises decoding the one of the second plurality of blocks using at least one of: predicting sample values of the one of the second plurality of blocks from sample values of the one of the first plurality of blocks; predicting an intra-mode of the one of the second plurality of blocks from an intra-mode of the one of the first plurality of blocks; predicting a motion vector of the one of the second plurality of blocks from a motion vector of the one of the first plurality of blocks; predicting a motion vector of the one of the second plurality of blocks from a motion vector of a reference picture used for the one of the first plurality of blocks; predicting a reference picture to use for inter-prediction of one of the second plurality of blocks based on a reference picture used for the one of the first plurality of blocks; selecting a motion vector to be used for the one of the second plurality of blocks based on a motion vector used for the one of the first plurality of blocks; predicting a quantization parameter value to use for the one of the second plurality of blocks based on a quantization parameter value used for the one of the first plurality of blocks; determining whether to skip an inverse transform for the one of the second plurality of blocks based on whether the inverse transform was skipped for the one of the first plurality of blocks; determining whether any transform coefficients are present in the one of the second plurality of blocks based on whether any transform coefficients are present in the one of the first plurality of blocks; determining a CABAC state used to decode a syntax element for the one of the second plurality of blocks based on at least one of, a mode of the one of the first plurality of blocks, a motion vector used by the one of the first plurality of blocks, a reference picture used by the one of the first plurality of blocks, coefficient values present in the one of the first plurality of blocks, and/or a CABAC state used to decode a syntax element for the one of the first plurality of blocks; determining a context to use to decode a syntax element for the one of the second plurality of blocks based on at least one of, a mode of the one of the first plurality of blocks, a motion vector used by the one of the first plurality of blocks, a reference picture used by the one of the first plurality of blocks, and/or coefficient values present in the one of the first plurality of blocks; and/or filtering samples in the one of the second plurality of blocks based on sample values of the one of the first plurality of blocks, wherein filtering comprises at least one of, in-loop deblocking filtering, sample adaptive offset filtering, adaptive loop filtering, bilateral filtering, and/or Hadamard filtering.

9. The method of any of Embodiments 1-8, wherein the first and second partitions comprises respective first and second segments included in a first segment group of the picture, wherein the partitioning structure defines third and fourth segments included in a second segment group of the picture.

10. The method of Embodiment 9, wherein the first, second, third, and fourth segments comprise respective first, second, third, and fourth tiles of the picture, and wherein the first and second segment groups comprise respective first and second tile groups of the picture.

11. The method of any of Embodiments 9-10, wherein determining whether the second partition is dependent on or independent of the first partition comprises determining whether a plurality of segments of the first segment group are dependent on or independent of respective other segments of the first segment group based on the dependency syntax element.

12. The method of any of Embodiments 10-11 further comprising: decoding a mode syntax element from the bitstream, wherein the mode syntax element specifies whether tile groups of the picture are rectangular tile groups or raster scan tile groups.

13. The method of Embodiment 12, wherein decoding the at least one dependency syntax element from the bitstream comprises, decoding a first dependency flag from the bitstream that specifies whether tiles of the first tile group are dependent on or independent of other tiles of the first tile group responsive to the mode syntax element specifying that the tile groups of the picture are rectangular tile groups, and decoding a second dependency flag from the bitstream that specifies whether tiles of the second tile group are dependent or independent of other tiles of the second tile group responsive to the mode syntax element specifying that the tile groups of the picture are rectangular tile groups.

14. The method of Embodiment 12, wherein decoding the at least one dependency syntax element further comprises, decoding a group number syntax element from the bitstream that specifies a number of tile groups of the picture, and decoding a respective dependency flag for each of the tile groups of the picture based on the group number syntax element responsive to the mode syntax element specifying that the tile groups of the picture are rectangular tile groups, wherein each dependency flag specifies whether tiles of the respective tile group are dependent or independent of other tiles of the respective tile group.

15. The method of Embodiment 12, wherein decoding the at least one dependency syntax element from the bitstream comprises, decoding a first dependency flag from the bitstream that specifies whether tiles of the first tile group are dependent on or independent of other tiles of the first tile group responsive to the mode syntax element specifying that the tile groups of the picture are raster scan tile groups, and decoding a second dependency flag from the bitstream that specifies whether tiles of the second tile group are dependent or independent of other tiles of the second tile group responsive to the mode syntax element specifying that the tile groups of the picture are raster scan tile groups.

16. The method of Embodiment 12, wherein decoding the at least one dependency syntax element further comprises, decoding a respective dependency flag for each of the tile groups of the picture responsive to the mode syntax element specifying that the tile groups of the picture are raster scan tile groups, wherein each dependency flag specifies whether tiles of the respective tile group are dependent or independent of other tiles of the respective tile group.

17. The method of any of Embodiments 15-16, wherein the dependency syntax element is included in a tile group header of the bit stream 18. The method of any of Embodiments 10-17, wherein the dependency syntax element specifies whether all tiles of the first tile group are independent of previously decoded tiles of the first tile group or whether each subsequent tile of the first tile group is dependent on a previously decoded tile of the first tile group.

19. The method of any of Embodiments 1-18, wherein the partition structure defines a plurality of rows and columns of partitions of the picture including the first and second partitions.

20. The method of any of Embodiments 1-19, wherein the dependency syntax element is included in a parameter set of the bit stream.

21. The method of Embodiment 20, wherein the parameter set comprises one of a picture parameter set and/or a sequence parameter set.

22. The method of any of Embodiments 1-21 further comprising: decoding (2503) a partitioning syntax element from the bitstream; wherein determining the partitioning structure comprises determining the partitioning structure based on the partitioning syntax element.

23. The method of Embodiment 22, wherein the partitioning syntax element is decoded from a parameter set.

24. The method of any of Embodiments 22-23, wherein the bitstream is a video bitstream, wherein the picture is one of a plurality of pictures in the video bitstream, and wherein the partitioning syntax element is used for at least two of the plurality of pictures.

25. The method of any of Embodiments 5-24, wherein the at least one dependency syntax element specifies a direction of dependency of the second partition relative to the first partition.

26. The method of Embodiment 25, wherein the at least one dependency syntax element specifies one of a direction in the picture of above, a direction in the picture to the left, or both a direction in the picture of above and to the left.

27. The method of any of Embodiments 1-26 further comprising: rendering (2515) the picture for display on a screen based on decoding the picture from the bitstream.

28. The method of any of Embodiments 1-27 further comprising: receiving (2501) the bitstream over a radio and/or network interface from a remote device (e.g., a remote server).

29. The method of any of Embodiments 1-28, wherein the bitstream is a video bitstream, and wherein the picture is one of a plurality of pictures in the video bitstream.

30. A method of encoding a picture for a bitstream, the method comprising: defining (2601) a partitioning structure of the picture, wherein the partitioning structure includes at least first and second partitions of the picture; determining (2605) whether the second partition is dependent on or independent of the first partition; encoding (2607) at least one dependency syntax element for the bitstream, wherein the at least one dependency syntax element specifies whether the second partition is dependent on or independent of the first partition; and encoding (2609) the first and second partitions into the bitstream based on determining the partitioning structure and based on determining whether the second partition of the picture is dependent on or independent of the first partition of the picture.

31. The method of Embodiment 30, wherein the first partition comprises at least one first tile, wherein the second partition comprises at least one second tile, and wherein determining whether the second partition is dependent on or independent of the first partition comprises determining whether the second partition is dependent on or independent of the first partition across a tile boundary between the at least one first tile and the at least one second tile.

32. The method of any of Embodiments 30-31, wherein determining whether the second partition is dependent on or independent of the first partition comprises determining that the second partition is independent of the first partition, and wherein encoding the picture comprises encoding the second partition independent of encoding the first partition.

33. The method of Embodiment 32, wherein encoding the picture comprises treating a boundary between the first and second partitions as a tile boundary.

34. The method of any of Embodiments 30-31, wherein determining whether the second partition is dependent on or independent of the first partition comprises determining that the second partition is dependent on the first partition, and wherein encoding the picture comprises encoding the second partition using at least one property from the first partition.

35. The method of Embodiment 34, wherein encoding the picture comprises treating a boundary between the first and second partitions as a block boundary.

36. The method of any of Embodiments 34-35, wherein the first partition comprises a first plurality of blocks, wherein the second partition comprises a second plurality of blocks, wherein encoding the picture comprises encoding one of the second plurality of blocks using at least one property from one of the first plurality of blocks.

37. The method of Embodiments 36, wherein encoding comprises encoding the one of the second plurality of blocks using at least one of: predicting sample values of the one of the second plurality of blocks from sample values of the one of the first plurality of blocks; predicting an intra-mode of the one of the second plurality of blocks from an intra-mode of the one of the first plurality of blocks; predicting a motion vector of the one of the second plurality of blocks from a motion vector of the one of the first plurality of blocks; predicting a motion vector of the one of the second plurality of blocks from a motion vector of a reference picture used for the one of the first plurality of blocks; predicting a reference picture to use for inter-prediction of one of the second plurality of blocks based on a reference picture used for the one of the first plurality of blocks; selecting a motion vector to be used for the one of the second plurality of blocks based on a motion vector used for the one of the first plurality of blocks; predicting a quantization parameter value to use for the one of the second plurality of blocks based on a quantization parameter value used for the one of the first plurality of blocks; determining whether to skip an inverse transform for the one of the second plurality of blocks based on whether the inverse transform was skipped for the one of the first plurality of blocks; determining whether any transform coefficients are present in the one of the second plurality of blocks based on whether any transform coefficients are present in the one of the first plurality of blocks; determining a CABAC state used to encode a syntax element for the one of the second plurality of blocks based on at least one of, a mode of the one of the first plurality of blocks, a motion vector used by the one of the first plurality of blocks, a reference picture used by the one of the first plurality of blocks, coefficient values present in the one of the first plurality of blocks, and/or a CABAC state used to encode a syntax element for the one of the first plurality of blocks; determining a context to use to encode a syntax element for the one of the second plurality of blocks based on at least one of, a mode of the one of the first plurality of blocks, a motion vector used by the one of the first plurality of blocks, a reference picture used by the one of the first plurality of blocks, and/or coefficient values present in the one of the first plurality of blocks; and/or filtering samples in the one of the second plurality of blocks based on sample values of the one of the first plurality of blocks, wherein filtering comprises at least one of, in-loop deblocking filtering, sample adaptive offset filtering, adaptive loop filtering, bilateral filtering, and/or Hadamard filtering.

38. The method of any of Embodiments 30-37, wherein the first and second partitions comprises respective first and second segments included in a first segment group of the picture, wherein the partitioning structure defines third and fourth segments included in a second segment group of the picture.

39. The method of Embodiment 38, wherein the first, second, third, and fourth segments comprise respective first, second, third, and fourth tiles of the picture, and wherein the first and second segment groups comprise respective first and second tile groups of the picture.

40. The method of any of Embodiments 38-39, wherein the at least one dependency syntax element specifies whether a plurality of segments of the first segment group are dependent on or independent of respective other segments of the first segment group based on the dependency syntax element.

41. The method of Embodiment 39 further comprising: encoding a mode syntax element from the bitstream, wherein the mode syntax element specifies whether tile groups of the picture are rectangular tile groups or raster scan tile groups.

42. The method of Embodiment 41, wherein encoding the at least one dependency syntax element from the bitstream comprises, encoding a first dependency flag from the bitstream that specifies whether tiles of the first tile group are dependent on or independent of other tiles of the first tile group when the mode syntax element specifies that the tile groups of the picture are rectangular tile groups, and encoding a second dependency flag from the bitstream that specifies whether tiles of the second tile group are dependent or independent of other tiles of the second tile group when the mode syntax element specifies that the tile groups of the picture are rectangular tile groups.

43. The method of Embodiment 41, wherein encoding the at least one dependency syntax element further comprises, encoding a group number syntax element from the bitstream that specifies a number of tile groups of the picture, and encoding a respective dependency flag for each of the tile groups of the picture based on the group number syntax element when the mode syntax element specifies that the tile groups of the picture are rectangular tile groups, wherein each dependency flag specifies whether tiles of the respective tile group are dependent or independent of other tiles of the respective tile group.

44. The method of Embodiment 41, wherein encoding the at least one dependency syntax element from the bitstream comprises, encoding a first dependency flag from the bitstream that specifies whether tiles of the first tile group are dependent on or independent of other tiles of the first tile group responsive to the mode syntax element specifying that the tile groups of the picture are raster scan tile groups, and encoding a second dependency flag from the bitstream that specifies whether tiles of the second tile group are dependent or independent of other tiles of the second tile group when the mode syntax element specifies that the tile groups of the picture are raster scan tile groups.

45. The method of Embodiment 41, wherein encoding the at least one dependency syntax element further comprises, encoding a respective dependency flag for each of the tile groups of the picture when the mode syntax element specifies that the tile groups of the picture are raster scan tile groups, wherein each dependency flag specifies whether tiles of the respective tile group are dependent or independent of other tiles of the respective tile group.

46. The method of Embodiment 39, wherein the dependency syntax element specifies whether all tiles of the first tile group are independent of previously encoded tiles of the first tile group or whether each subsequent tile of the first tile group is dependent on a previously encoded tile of the first tile group.

47. The method of any of Embodiments 30-46, wherein the partition structure defines a plurality of rows and columns of partitions of the picture including the first and second partitions.

48. The method of any of Embodiments 30-47, wherein the dependency syntax element is included in a parameter set of the bit stream.

49. The method of Embodiment 48, wherein the parameter set comprises one of a picture parameter set and/or a sequence parameter set.

50. The method of any of Embodiments 30-49 further comprising: encoding (2603) a partitioning syntax element for the bitstream, wherein the partitioning syntax element defines the partitioning structure of the picture based on determining the partitioning structure.

51. The method of Embodiment 50, wherein the partitioning syntax element is encoded for a parameter set.

52. The method of any of Embodiments 50-51, wherein the bitstream is a video bitstream, wherein the picture is one of a plurality of pictures in the video bitstream, and wherein the partitioning syntax element is used for at least two of the plurality of pictures.

53. The method of any of Embodiments 34-52, wherein the at least one dependency syntax element specifies a direction of dependency of the second partition relative to the first partition.

54. The method of Embodiment 53, wherein the at least one dependency syntax element specifies one of a direction in the picture of above, a direction in the picture to the left, or both a direction in the picture of above and to the left.

55. The method of any of Embodiments 30-54 further comprising: transmitting (2611) the bitstream over a network and/or radio interface to a remote device (e.g., a wireless device UE).

56. The method of any of Embodiments 30-55, wherein the bitstream is a video bitstream, and wherein the picture is one of a plurality of pictures in the video bitstream.

57. A method for decoding a picture from a bitstream, the method comprising: a) Decoding a segment partitioning structure from one or more syntax elements in the bitstream; b) Determining the number of segments N there are in the picture; c) Decoding the number of segment groups there are in the picture where each segment group consists of an integer number of segments; d) Decoding one or more syntax elements in the bitstream describing the dependencies between at least two partitions, wherein a partition is a segment or a segment group; e) Deriving dependencies between the at least two partitions from the decoded syntax element(s) describing the dependencies between the at least two partitions; and f) Using the derived dependencies to decode the picture.

58. The method of Embodiment 57 where either all segments in a segment group S are independent of each other or not.

59. The method of Embodiment 58 wherein all segments not being independent comprises that for each segment A in the segment group S, segment A depends on another segment B in the segment group S or there is a segment C in the segment group S such that segment C depends on segment A.

60. The method of any of Embodiments 57-59 where one or more syntax elements describing the partition dependencies are flags.

61. The method of any of Embodiments 57-60 where one or more syntax elements describing the dependencies of the at least two partitions are specified per partition.

62. The method of any of Embodiments 57-61 where one or more syntax elements describing the dependencies of the at least two partitions are specified per picture or per sequence.

63. The method of any of Embodiments 57-62 where one or more syntax elements describing the dependencies of the at least two partitions consist of one or more flags controlling different dependency aspects between the at least two partitions such as availability for inter prediction, availability for intra prediction, CABAC state, availability of samples for filtering, etc.

64. The method of any Embodiments 57-63 where one or more syntax elements describe the directional partition dependencies in the way such that for at least two partitions A and B, the dependency of partition A on partition B and the dependency of partition B on partition A are specified or inferred independent from each other.

65. The method of any of Embodiments 57-64 where for dependent partitions, the CABAC state is stored and synched in a similar way as for dependent slices in HEVC (see the decoding process described above).

66. The method of any of Embodiments 57-65 where the dependency of two partitions A and B is defined as a complete merge which results in a new partition C with the area of the union of the two partitions A and B.

67. The method of any of Embodiments 57-66 where one or more syntax elements describing the partition dependencies are flags indicating for each partition A, which neighboring partition to partition A the partition A depends on.

68. The method of any of Embodiments 57-67 where dependencies comprises partitions either being dependent or independent as described above with respect to details on dependent and independent partitions.

69. The method of any of Embodiments 57-68 where a partition is a segment or a segment group.

70. The method of any of Embodiments 57-69 where a segment group is a tile group.

71. The method of any of Embodiments 57-70 where a segment is a tile.

72. A method for decoding a current picture from a bitstream, the method comprising: a) Decoding a partitioning structure from one or more syntax elements S1 in the bitstream wherein the partitioning structure partitions one or more pictures into at least two partitions P1 and P2; b) Determining whether the at least two partitions P1 and P2 are dependent or independent by decoding one or more syntax elements S2 in the bitstream; c) If the at least two partitions P1 and P2 are determined to be dependent, decode the current picture wherein there is at least one block B2 in the current picture belonging to P2 that is decoded after B1 is decoded and B2 is decoded using at least one decoded property from at least one block B1 in the current picture belonging to P1; and d) If the at least two partitions P1 and P2 are independent, decode the current picture wherein there is no block B2 in the current picture belonging to P2 that is decoded using any decoded property of any block B1 in the current picture belonging to P1.

73. The method of Embodiment 72 wherein a partition is a tile and the tiles are grouped into tile groups.

74. The method of Embodiment 73 wherein determining whether the at least two partitions P1 and P2 are dependent or independent comprises determining from the one or more syntax elements S2 whether either all tiles in a tile group are dependent or all tiles in a tile group are independent.

75. The method of any of Embodiments 72-74, wherein the partitioning structure partitions the picture into rows and columns where a partition is an intersection between one row and one column.

76. The method of any of Embodiments 72-75, wherein the one or more syntax elements S1 in the bitstream is located in a parameter set such as a picture parameter set or a sequence parameter set.

77. The method of any of Embodiments 72-76, wherein decode the current picture comprises a subset S of the following listed elements: a) If the at least two partitions are dependent, Intra sample prediction of B2 is done by predicting sample values in B2 from sample values in B1. If the at least two partitions are not dependent, Intra sample prediction of B2 is done without using any sample value in B1; b) If the at least two partitions are dependent, the Intra mode of B2 is predicted by an Intra mode of B1. If the at least two partitions are not dependent, the Intra mode of B2 is derived without using any Intra mode in B1; c) If the at least two partitions are dependent, the motion vector for B2 may be predicted from a motion vector of B1 and/or a reference picture used for B1. If the at least two partitions are not dependent, the motion vector for B2 is derived without using any motion vector or reference picture used for B1; d) If the at least two partitions are dependent, the reference picture to use for Inter prediction of B2 may be predicted from the reference picture used for B1. If the at least two partitions are not dependent, the reference picture to use for Inter prediction of B2 is derived without using any reference picture used for B1; e) If the at least two partitions are dependent, the motion vector to use for B2 may be selected from a motion vector in B1, for example by a merge process. If the at least two partitions are not dependent, the motion vector to use for B2 is derived without selecting any motion vector in B1; f) If the at least two partitions are dependent, the quantization parameter value to use for B2 may be predicted or copied from a quantization parameter value of B1. If the at least two partitions are not dependent, the quantization parameter value to use for B2 is derived without using any quantization parameter value of B1; g) If the at least two partitions are dependent, the derivation of whether the inverse transform for B2 is skipped or not may depend on whether the inverse transform for B1 was skipped or not and/or other properties of B1. If the at least two partitions are not dependent, the derivation of whether the inverse transform for B2 is skipped or not is derived without depending on whether the inverse transform for B1 was skipped or not or any other property of B1; h) If the at least two partitions are dependent, the derivation of whether there are any transform coefficients in B2 may depend on whether there are any transform coefficients in B1 or not and/or other properties of B1. If the at least two partitions are not dependent, the derivation of whether there are any transform coefficients in B2 is derived without depending on whether there are any transform coefficients in B1 or not or any other property of B1; i) If the at least two partitions are dependent, the CABAC state for decoding of a syntax element for B2 may depend on properties of B1 such as but not limited to what mode B1 was coded as, what motion vector B1 uses, what reference picture B1 uses, what coefficient values there are in B1 and what state CABAC was in for B1. If the at least two partitions are not dependent, the CABAC state for decoding of a syntax element for B2 is derived without using any property of B1 j) If the at least two partitions are dependent, the context to use for decoding of a syntax element for B2 may depend on properties of B1 such as at least one property of what mode B1 was coded as, what motion vector B1 uses, what reference picture B1 uses, or what coefficient values there are in B1. If the at least two partitions are not dependent, the context to use for decoding of a syntax element for B2 is derived without using without using any property of B1; and k) If the at least two partitions are dependent, filtering of samples in B2 may depend on sample values in B1 where filtering may comprise in-loop deblocking filtering, or sample adaptive offset (SAO) filtering or Adaptive loop filtering (ALF) or bilateral filtering or Hadamard filtering. If the at least two partitions are not dependent, filtering of samples in B2 is performed without using any sample values in B1.

78. An electronic device (300, 600), the electronic device comprising: processing circuitry (303, 603); and memory (305, 605) coupled with the processing circuitry, wherein the memory includes instructions that when executed by the processing circuitry causes the electronic device to perform operations according to any of Embodiments 1-77.

79. A electronic device (300, 600), wherein the electronic device is adapted to perform according to any of Embodiments 1-77.

80. A computer program comprising program code to be executed by processing circuitry (303, 603) of an electronic device (300, 600), whereby execution of the program code causes the electronic device (300, 600) to perform operations according to any of embodiments 1-77.

81. A computer program product comprising a non-transitory storage medium including program code to be executed by processing circuitry (303, 503) of a wireless device (300, 600), whereby execution of the program code causes the electronic device (300, 600) to perform operations according to any of embodiments 1-77.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The operations/steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method for decoding a picture from a bitstream, the method comprising:
    decoding a segment partitioning structure from one or more syntax elements in the bitstream;
    decoding a number, M, from a syntax element in a parameter set, wherein M represents the number of segment groups there are in the picture, and wherein each segment group consists of an integer number of segments;
    decoding, in a loop executing once for each partition of the segment partitioning structure, wherein the segment partitioning structure defines at least two partitions of the picture, one or more dependency syntax elements from a parameter set in the bitstream, the one or more dependency syntax elements describing dependencies between the at least two partitions, wherein a partition is a segment group and the loop executes M times;
    deriving the dependencies between the at least two partitions using the one or more decoded dependency syntax elements; and
    using the derived dependencies to decode the picture.

2. The method of claim 1, wherein the partitioning structure defines at least first and second partitions of the picture and
    wherein deriving the dependencies between the at least two partitions comprises determining whether the second partition is dependent on or independent of the first partition based on the decoded at least one dependency syntax element; and
    responsive to determining that the second partition is dependent on the first partition, decoding the picture by decoding the second partition using at least one property decoded from the first partition, wherein the first partition comprises a first plurality of blocks, the second partition comprises a second plurality of blocks, and decoding the picture comprises decoding one of the second plurality of blocks using the at least one property decoded from one of the first plurality of blocks.

3. The method of claim 2, wherein decoding the picture comprises decoding the one of the second plurality of blocks using at least one of:

predicting sample values of the one of the second plurality of blocks from sample values of the one of the first plurality of blocks;

predicting an intra-mode of the one of the second plurality of blocks from an intra-mode of the one of the first plurality of blocks;

predicting a motion vector of the one of the second plurality of blocks from a motion vector of the one of the first plurality of blocks;

predicting a quantization parameter value to use for the one of the second plurality of blocks based on a quantization parameter value used for the one of the first plurality of blocks;

determining a CABAC state used to decode a syntax element for the one of the second plurality of blocks based on at least one of,
a mode of the one of the first plurality of blocks, and
a CABAC state used to decode a syntax element for the one of the first plurality of blocks; and filtering samples in the one of the second plurality of blocks based on sample values of the one of the first plurality of blocks, wherein filtering comprises at least one of,
in-loop deblocking filtering,
sample adaptive offset filtering, and
adaptive loop filtering.

4. The method of claim 1, wherein a segment is a tile.

5. The method of claim 1, where a segment group is a tile group.

6. The method of claim 4, further comprising:
decoding from the bitstream a mode syntax element that specifies whether tile groups of the picture are rectangular tile groups or raster scan tile groups.

7. The method of claim 6, wherein decoding the at least one dependency syntax element further comprises,
decoding a group number syntax element from the bitstream that specifies a number of tile groups of the picture, and
decoding a respective dependency flag for each of the tile groups of the picture based on the group number syntax element, responsive to the mode syntax element specifying that the tile groups of the picture are rectangular tile groups, wherein each dependency flag specifies whether tiles of the respective tile group are dependent or independent of other tiles of the respective tile group.

8. The method of claim 1, wherein the partition structure defines a plurality of rows and columns of partitions of the picture including the first and second partitions.

9. The method of claim 1 further comprising:
decoding a partitioning syntax element from the bitstream,
wherein determining the partitioning structure comprises determining the partitioning structure based on the partitioning syntax element.

10. The method of claim 9, wherein the bitstream is a video bitstream, wherein the picture is one of a plurality of pictures in the video bitstream, and wherein the partitioning syntax element is used for at least two of the plurality of pictures.

11. The method of claim 1 further comprising:
rendering the picture for display on a screen based on decoding the picture from the bitstream.

12. The method of claim 1 further comprising:
receiving the bitstream over a radio and/or network interface from a remote device.

13. The method of claim 1, wherein the bitstream is a video bitstream, and wherein the picture is one of a plurality of pictures in the video bitstream.

14. An electronic device, the electronic device comprising:
processing circuitry; and
memory coupled with the processing circuitry, wherein the memory includes instructions that when executed by the processing circuitry causes the electronic device to:
decode a segment partitioning structure from one or more syntax elements in a bitstream;
decode a number, M, from a syntax element in a parameter set, wherein M represents the number of segment groups there are in the picture, and wherein each segment group consists of an integer number of segments;
decode, in a loop executing once for each partition of the segment partitioning structure, wherein the segment partitioning structure defines at least two partitions of the picture, one or more dependency syntax elements from a parameter set in the bitstream, the one or more dependency syntax elements describing dependencies between the at least two partitions, wherein a partition is a segment group and the loop executes M times;
derive the dependencies between the at least two partitions from the one or more decoded dependency syntax elements; and
use the derived dependencies to decode the picture.

15. The electronic device of claim 14, wherein the partitioning structure defines at least first and second partitions of the picture and
wherein derive the dependencies between the at least two partitions comprises determine whether the second partition is dependent on or independent of the first partition based on the decoded at least one dependency syntax element; and
responsive to determine that the second partition is dependent on the first partition,
decode the picture by decoding the second partition using at least one property decoded from the first partition,
wherein the first partition comprises a first plurality of blocks, the second partition comprises a second plurality of blocks, and decode the picture comprises decoding one of the second plurality of blocks using the at least one property decoded from one of the first plurality of blocks.

16. The electronic device of claim 15, wherein decode the picture comprises decoding the one of the second plurality of blocks using at least one of:
predict sample values of the one of the second plurality of blocks from sample values of the one of the first plurality of blocks;

predict an intra-mode of the one of the second plurality of blocks from an intra-mode of the one of the first plurality of blocks;
predict a motion vector of the one of the second plurality of blocks from a motion vector of the one of the first plurality of blocks;
predict a quantization parameter value to use for the one of the second plurality of blocks based on a quantization parameter value used for the one of the first plurality of blocks;
determine a CABAC state used to decode a syntax element for the one of the second plurality of blocks based on at least one of,
a mode of the one of the first plurality of blocks, and
a CABAC state used to decode a syntax element for the one of the first plurality of blocks; and
filter samples in the one of the second plurality of blocks based on sample values of the one of the first plurality of blocks, wherein the filter comprises at least one of,
in-loop deblocking filtering,
sample adaptive offset filtering, and
adaptive loop filtering.

17. The electronic device of claim 14, wherein a segment is a tile.

18. The electronic device of claim 14, where a segment group is a tile group.

19. The electronic device of claim 17, wherein the memory incudes instructions that when executed by the processing circuitry causes the electronic device to perform further operations comprising:
decode from the bitstream a mode syntax element that specifies whether tile groups of the picture are rectangular tile groups or raster scan tile groups.

20. A computer program product comprising a non-transitory computer-readable medium having instructions stored thereon that when executed by a processor causes the processor to:
decode a segment partitioning structure from one or more syntax elements in a bitstream;
decode the number, M, from a syntax element in a parameter set, wherein M represents the number of segment groups there are in the picture, and wherein each segment group consists of an integer number of segments;
decode, in a loop executing once for each partition of the segment partitioning structure, wherein the segment partitioning structure defines at least two partitions of the picture, one or more dependency syntax elements from a parameter set in the bitstream, the one or more dependency syntax elements describing dependencies between the at least two partitions, wherein a partition is a segment group and the loop executes M times;
derive the dependencies between the at least two partitions from the one or more decoded dependency syntax elements; and
use the derived dependencies to decode the picture.

* * * * *